US011485488B1

(12) United States Patent
Armer et al.

(10) Patent No.: US 11,485,488 B1
(45) Date of Patent: Nov. 1, 2022

(54) VERTICAL TAKE-OFF AND LANDING AIRCRAFT WITH ROTOR THRUST YAW CONTROL

(71) Applicant: L3HARRIS LATITUDE LLC, Melbourne, FL (US)

(72) Inventors: Justin Armer, Tucson, AZ (US); Carlos Murphy, Tucson, AZ (US); Jason Michael K. Douglas, Tucson, AZ (US)

(73) Assignee: L3HARRIS LATITUDE LLC, Melbourne, FL (US)

( * ) Notice: Subject to any disclaimer, the term of this patent is extended or adjusted under 35 U.S.C. 154(b) by 1281 days.

(21) Appl. No.: 14/959,617

(22) Filed: Dec. 4, 2015

Related U.S. Application Data

(60) Provisional application No. 62/088,632, filed on Dec. 7, 2014.

(51) Int. Cl.
B64C 29/00 (2006.01)
B64C 39/02 (2006.01)
B64C 5/02 (2006.01)
B64C 17/00 (2006.01)

(52) U.S. Cl.
CPC ............ B64C 29/0025 (2013.01); B64C 5/02 (2013.01); B64C 17/00 (2013.01); B64C 39/024 (2013.01); B64C 2201/021 (2013.01); B64C 2201/024 (2013.01); B64C 2201/108 (2013.01)

(58) Field of Classification Search
CPC ............ B64C 29/0025; B64C 29/0033; B64C 29/005; B64C 29/0075; B64C 27/08; B64C 27/20; B64C 27/26; B64C 39/04
See application file for complete search history.

(56) References Cited

U.S. PATENT DOCUMENTS

| | | | | |
|---|---|---|---|---|
| 3,454,241 A | * | 7/1969 | Riemerschmid | .... B64C 29/0075 244/15 |
| 4,492,353 A | * | 1/1985 | Phillips | ............... B64C 29/0075 244/12.4 |
| 5,419,514 A | * | 5/1995 | Ducan | ................. B64C 29/0033 244/12.4 |
| 7,188,803 B2 | * | 3/2007 | Ishiba | ................. B64C 29/0025 244/23 R |
| 8,485,464 B2 | * | 7/2013 | Kroo | ................... B64C 29/0025 244/17.23 |
| 8,931,729 B2 | * | 1/2015 | Abde Qader Alzu'bi et al. ......... B64C 27/20 244/17.13 |
| 2013/0092799 A1 | * | 4/2013 | Tian | ....................... B64C 27/26 244/7 R |
| 2016/0059958 A1 | * | 3/2016 | Kvitnevskiy | ........... B64C 27/08 701/3 |

* cited by examiner

*Primary Examiner* — Richard R. Green
(74) *Attorney, Agent, or Firm* — Sheppard, Mullin, Richter & Hampton LLP

(57) ABSTRACT

A vertical take-off and landing aircraft includes a fixed wing airframe having opposed first and second wings extending from first and second sides, respectively, of a fuselage having opposed leading and trailing extremities, and a tail assembly located behind the trailing extremity. Vertical take-off and landing (VTOL) thrust rotors are mounted to the airframe providing vertical lift to the aircraft, and a forward thrust rotor is mounted to the airframe for providing forward thrust to the aircraft. At least one of VTOL thrust rotors is laterally tilted with respect to the airframe for providing vertical lift and yaw control authority to the aircraft.

16 Claims, 17 Drawing Sheets

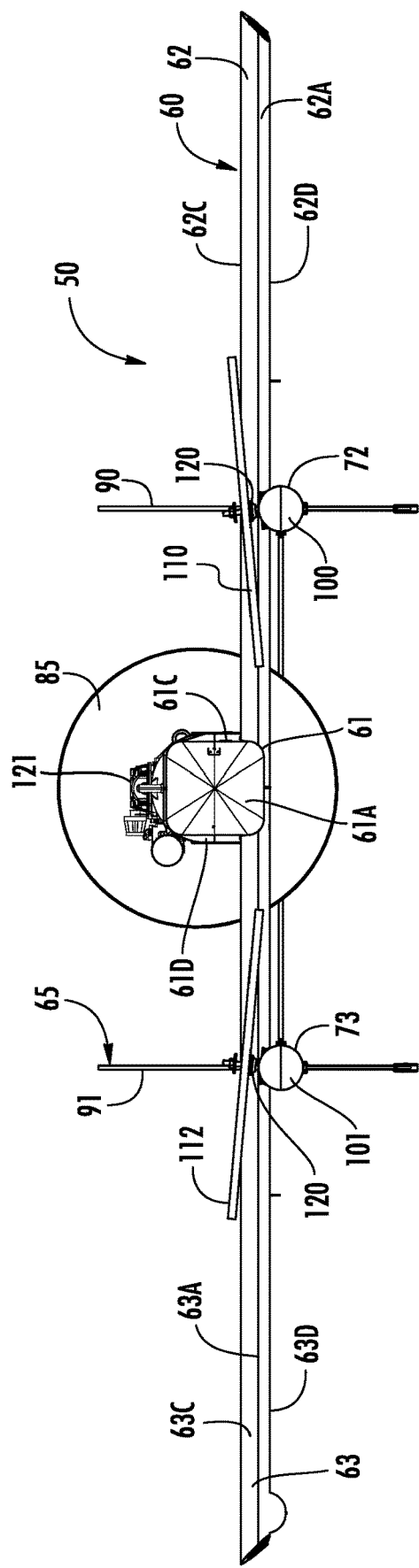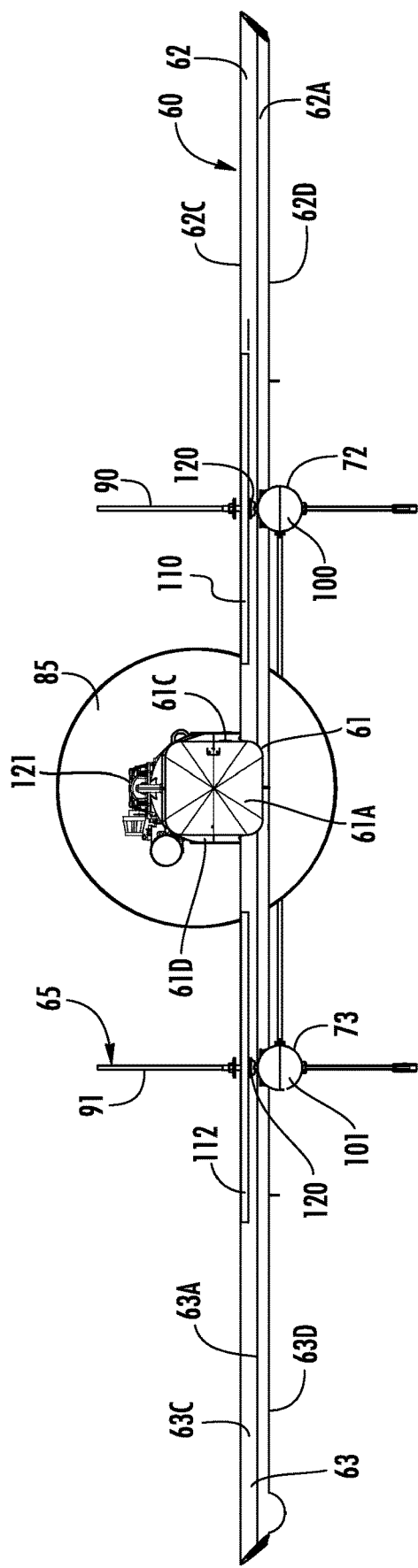

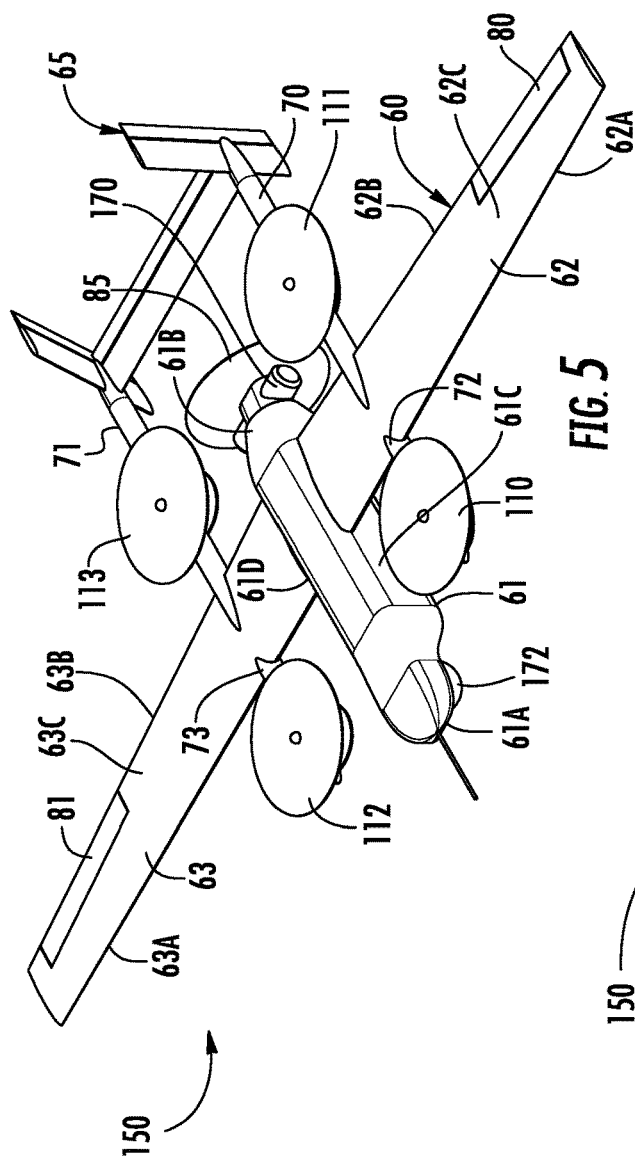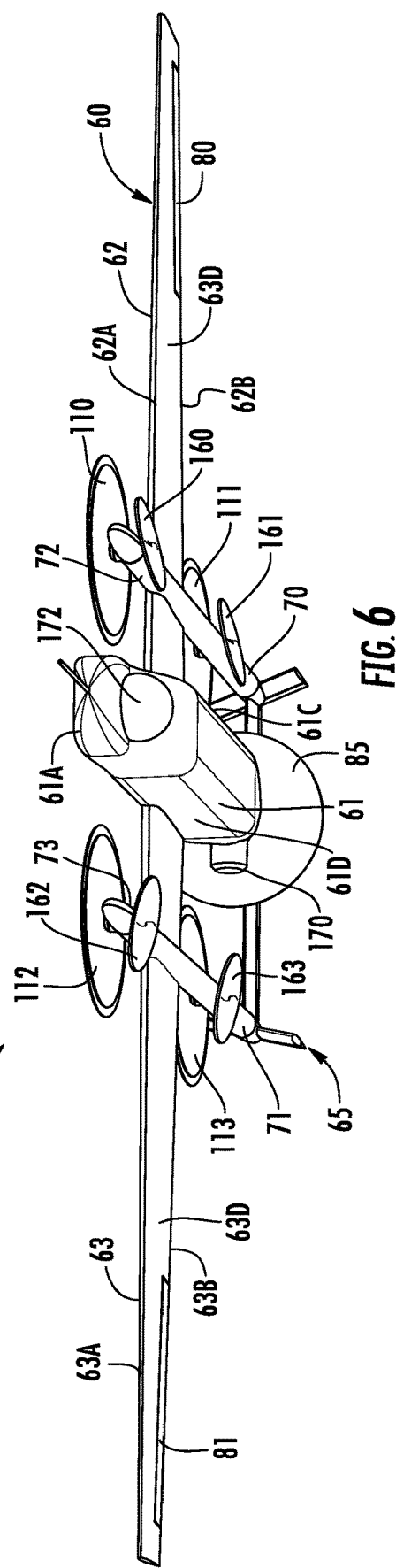

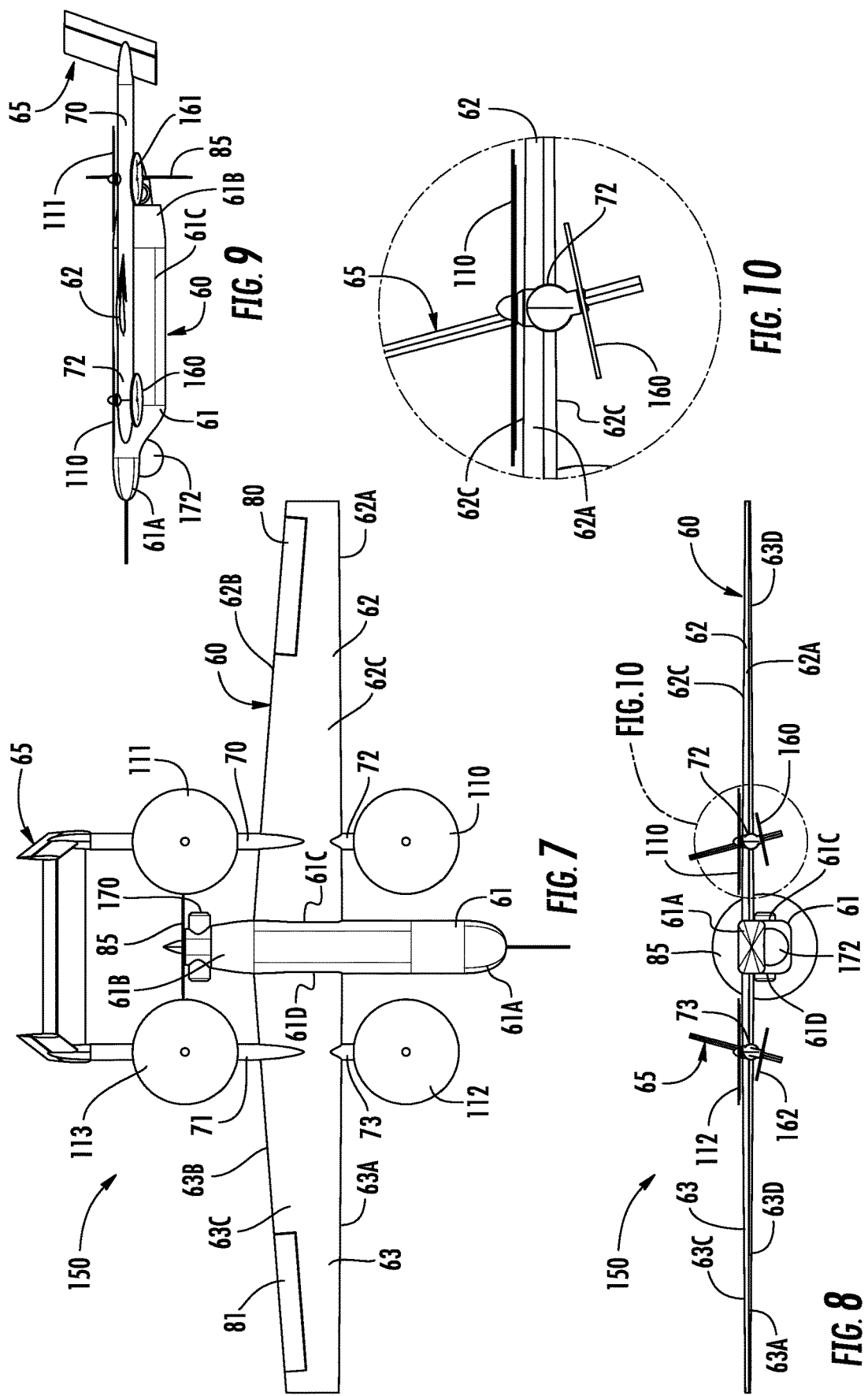

VERTICAL TAKE-OFF AND LANDING AIRCRAFT WITH ROTOR THRUST YAW CONTROL

FIELD OF THE INVENTION

The present invention relates to aerial vehicles and, more particularly, to unmanned aerial vehicle or drones.

BACKGROUND OF THE INVENTION

An unmanned aerial vehicle (UAV), commonly known as a drone, is an aircraft without a human pilot onboard. The flight of a drone is controlled autonomously by computers in the vehicle, or under remote control of a navigator or pilot on the ground or in another vehicle.

One class of drone is the vertical take-off and landing (VTOL) drone. There are many examples of VTOL drones in the prior art. Some exemplary VTOL drones incorporate tilt rotors, such as two large propellers mounted to the ends of an abbreviated wing designed to tilt the propellers from a horizontal position for vertical lift and a forward position for providing forward thrust. This design is effective but is difficult to engineer and construct, and is inherently unstable between the vertical and horizontal positions of the propellers. Another exemplary class of VTOL drones utilizes redirected thrust to provide vertical lift and forward thrust, which incorporate turbofan/jet engines that produce tremendous amounts of directed thrust, which is redirected downward for VTOL maneuvers. VTOL drones that incorporate redirected thrust systems are difficult to engineer and construct and are inherently unstable between the direct and redirected thrust orientations. Furthermore, the turbofan/jet engines of redirected thrust VTOL drones are prone to overheating and failure during prolonged VTOL maneuvering, which, of course, prevents redirected thrust VTOL drones from engaging in persistent VTOL maneuvers.

In an effort to solve these and other and other deficiencies in tilt-rotor and redirected thrust VTOL drone designs, skilled artisans have developed fixed wing VTOL drones with independently powered VTOL thrusters, and an independently powered forward thruster. This arrangement provides better stability during the transition between VTOL maneuvers and horizontal flight. Yaw control authority multi-rotor VTOL aircraft is gained by varying torque on sets of diagonal rotors. However, standard multi-rotor control schemes require large yaw control inputs for relatively little yaw control effect. Accordingly, yaw control authority remains cumbersome and slow in standard multi-rotor VTOL aircraft, thereby necessitating continued improvement in the art.

SUMMARY OF THE INVENTION

According to the principle of the invention, a vertical take-off and landing aircraft includes a fixed wing airframe having first and second wings extending from first and second sides, respectively, of a fuselage having a leading extremity and a trailing extremity, and a tail assembly located behind the trailing extremity. A forward thrust rotor is mounted to the airframe for providing forward thrust to the aircraft. Vertical take-off and landing (VTOL) thrust rotors are mounted to the airframe for providing vertical lift to the aircraft. The VTOL thrust rotors include a first set of VTOL thrust proximate to the first side of the fuselage, and a second set of VTOL thrust rotors proximate to the second side of the fuselage. The VTOL thrust rotors of the first set of VTOL thrust rotors are identically laterally tilted to a lateral tilt with respect to the fuselage, the VTOL thrust rotors of the second set of VTOL thrust rotors are identically laterally tilted to a lateral tilt with respect to the fuselage, and the lateral tilt of the VTOL thrust rotors of the first set of VTOL thrust rotors is the mirror image of the lateral tilt of the VTOL thrust rotors of the second set of VTOL thrust rotors. The first set of VTOL thrust rotors includes a first front VTOL thrust rotor and a first rear VTOL thrust rotor each located outboard of the first side of the fuselage between the leading extremity of the fuselage and the tail assembly, and the second set of VTOL thrust rotors includes a second front VTOL thrust rotor and a second rear VTOL thrust rotor each located outboard of the second side of the fuselage between the leading extremity of the fuselage and the tail assembly. The first front VTOL thrust rotor and the second front VTOL thrust rotor are diametrically opposed, and are equidistant with respect to the first and second wings, respectively, and the fuselage. The first rear VTOL thrust rotor and the second rear VTOL thrust rotor are diametrically opposed, and are equidistant with respect to the first and second wings, respectively, and the fuselage. The first front VTOL thrust rotor is in-line with respect to the first rear VTOL thrust rotor, and the second front VTOL thrust rotor is in-line with respect to the second rear VTOL thrust rotor.

According to the principle of the invention, a vertical take-off and landing aircraft includes a fixed wing airframe having first and second wings extending from first and second sides, respectively, of a fuselage having a leading extremity and a trailing extremity, and a tail assembly located behind the trailing extremity. A forward thrust rotor is mounted to the airframe for providing forward thrust to the aircraft. Vertical take-off and landing (VTOL) thrust rotors are mounted to the airframe for providing vertical lift to the aircraft. The VTOL thrust rotors include a first set of VTOL thrust proximate to the first side of the fuselage and a second set of VTOL thrust rotors proximate to the second side of the fuselage. Yaw control (YC) thrust rotors are mounted to the airframe for providing yaw control authority to the aircraft. The YC thrust rotors include a first set of VTOL thrust proximate to the first side of the fuselage and a second set of VTOL thrust rotors proximate to the second side of the fuselage. The YC thrust rotors of the first set of YC thrust rotors are identically laterally tilted to a lateral tilt with respect to the fuselage, the YC thrust rotors of the second set of YC thrust rotors are identically laterally tilted to a lateral tilt with respect to the fuselage, and the lateral tilt of the YC thrust rotors of the first set of YC thrust rotors is the mirror image of the lateral tilt of the YC thrust rotors of the second set of YC thrust rotors. The first set of VTOL thrust rotors includes a first front VTOL thrust rotor and a first rear VTOL thrust rotor each located outboard of the first side of the fuselage between the leading extremity of the fuselage and the tail assembly, and the second set of VTOL thrust rotors includes a second front VTOL thrust rotor and a second rear VTOL thrust rotor each located outboard of the second side of the fuselage between the leading extremity of the fuselage and the tail assembly. The first front VTOL thrust rotor and the second front VTOL thrust rotor are diametrically opposed, and are equidistant with respect to the first and second wings, respectively, and the fuselage. The first rear VTOL thrust rotor and the second rear VTOL thrust rotor are diametrically opposed, and are equidistant with respect to the first and second wings, respectively, and the fuselage. The first front VTOL thrust rotor is in-line with respect to the first rear VTOL thrust rotor, and the second front VTOL thrust rotor is in-line with respect to the second rear VTOL thrust rotor. The first set of YC thrust rotors includes a first front YC thrust rotor and a first rear YC thrust rotor each located outboard of the first side of the fuselage between the leading extremity of the fuselage and the tail assembly. The second set of YC thrust rotors includes a second front YC thrust rotor and a second rear YC thrust rotor each located outboard of the second side of the fuselage between the leading extremity of the fuselage and the tail assembly. The first front YC thrust rotor and the second front YC thrust rotor are diametrically opposed, and are equidistant with respect to the first and second wings, respectively, and the fuselage. The first rear YC thrust rotor and the second rear YC thrust rotor are diametrically opposed, and are equidistant with respect to the first and second wings, respectively, and the fuselage. The first front YC thrust rotor is in-line with respect to the first rear YC thrust rotor, and the second front YC thrust rotor is in-line with respect to the second rear YC thrust rotor. The first front YC thrust rotor is under the first front VTOL thrust rotor, the first rear YC thrust rotor is under the first rear VTOL thrust rotor, the second front YC thrust rotor is under the second front VTOL thrust rotor, and the second rear YC thrust rotor is under the second rear VTOL thrust rotor. Each of the VTOL thrust rotors of the first and second sets of VTOL thrust rotors has a first size, each of the YC thrust rotors of the first and second sets of YC thrust rotors has a second size, and the first size is greater than the second size.

According to the principle of the invention, a vertical take-off and landing aircraft includes a fixed wing airframe having first and second wings extending from first and second sides, respectively, of a fuselage having a leading extremity and a trailing extremity, and a tail assembly proximate to the trailing extremity. A fin extends downwardly from the fuselage between the trailing extremity and the first and second wings. The fin includes a first control surface facing outwardly from the first side of the fuselage and a second control surface facing outwardly from the second side of the fuselage. A forward thrust rotor is mounted to the airframe for providing forward thrust to the aircraft. Vertical take-off and landing (VTOL) thrust rotors are mounted to the airframe for providing vertical lift to the aircraft. One of the VTOL thrust rotors is mounted atop the fuselage over the fin for movement from a first laterally tilted position relative to the fuselage toward the first side of the fuselage for angled yaw authority thrust vectoring against the first control surface to a second laterally tilted position relative to the fuselage toward the second side of the fuselage for angled yaw authority thrust vectoring against the second control surface. The VTOL thrust rotors further include a first VTOL thrust rotor proximate to the first side of the fuselage and a second VTOL thrust rotor proximate to the second side of the fuselage. The one of the VTOL thrust rotors mounted atop the fuselage is equidistant with respect to the first VTOL thrust rotor and the second VTOL thrust rotor.

According to the principle of the invention, a vertical take-off and landing aircraft includes a fixed wing airframe having first and second wings extending from first and second sides, respectively, of a fuselage having a leading extremity and a trailing extremity, and a tail assembly proximate to the trailing extremity. A fin extends downwardly from the fuselage between the trailing extremity and the first and second wings, the fin includes a first control surface facing outwardly from the first side of the fuselage and a second control surface facing outwardly from the second side of the fuselage. A forward thrust rotor mounted to the airframe for providing forward thrust to the aircraft. Vertical take-off and landing (VTOL) thrust rotors mounted to the airframe for providing vertical lift to the aircraft. One of the VTOL thrust rotors is mounted atop the fuselage over the fin. The fin is movable between a first yaw control positon angled outwardly from the first side of the fuselage under the one of the VTOL thrust rotors and a second yaw control position angled outwardly from the second side of the fuselage under the one of the VTOL thrust rotors. The one of the VTOL thrust rotors mounted atop the fuselage over the fin is laterally tilted with respect to the fuselage. The VTOL thrust rotors further include a first VTOL thrust rotor proximate to the first side of the fuselage and a second VTOL thrust rotor proximate to the second side of the fuselage. The one of the VTOL thrust rotors is mounted atop the fuselage is equidistant with respect to the first VTOL thrust rotor and the second VTOL thrust rotor.

BRIEF DESCRIPTION OF THE DRAWINGS

Referring to the drawings:

FIG. 4A is a view similar to that of FIG. 3 illustrating the rotors tilted inwardly;

FIG. 4B is a view corresponding to FIGS. 3 and 4A illustrating the rotors in a horizontal position relative the tilted positions of FIG. 3 and FIG. 4A;

FIG. 5 is a top perspective view of an alternate embodiment of a vertical take-off and landing aircraft constructed and arranged in accordance with the principle of the invention;

FIG. 6 is a bottom perspective view of the embodiment of FIG. 5;

FIG. 7 is a top plan view of the embodiment of FIG. 5;

FIG. 8 is a front elevation view of the embodiment of FIG. 5;

FIG. 9 is a left side elevation view of the embodiment of FIG. 5;

FIG. 10 is an enlarged fragmentary view corresponding to FIG. 8 illustrating upper and lower rotors;

DETAILED DESCRIPTION

Figure 1:
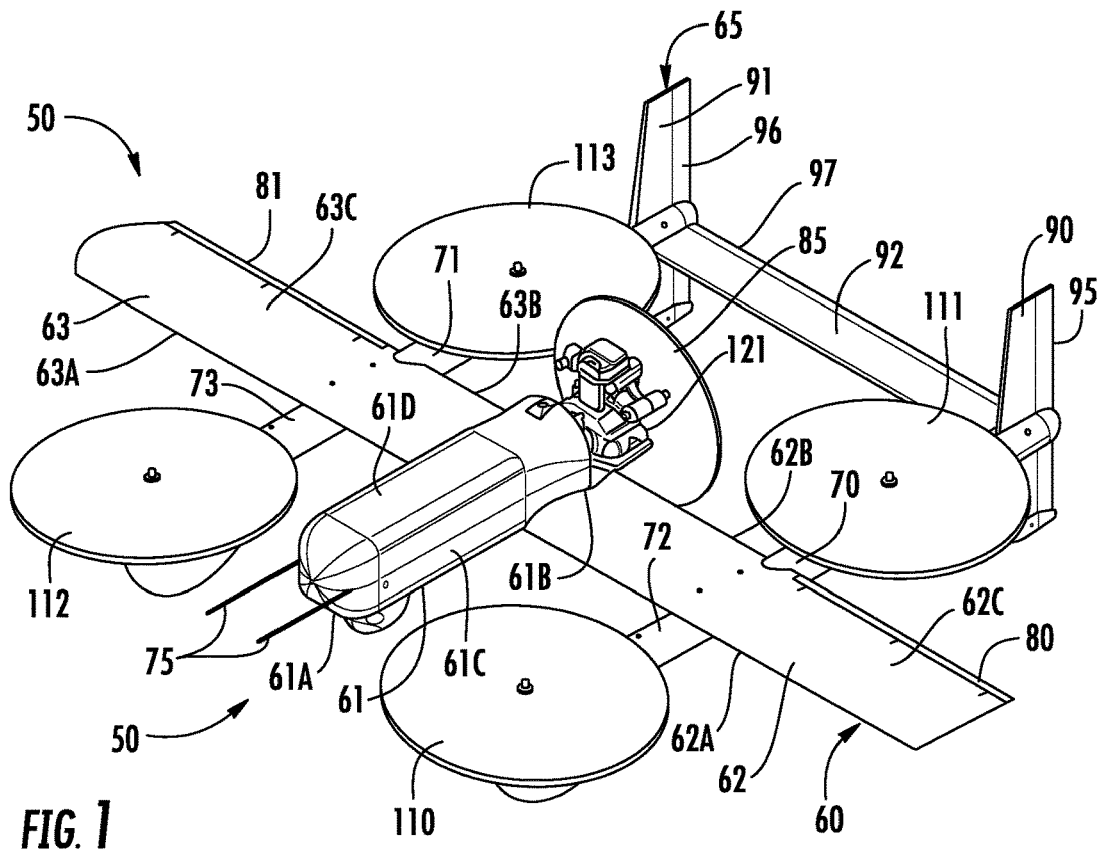
FIG. 1 is a top perspective view of a vertical take-off and landing aircraft constructed and arranged in accordance with the principle of the invention.

Referring to the drawings, in which like reference characters indicate corresponding elements throughout the several views, shown and described herein are illustrative embodiments of yaw thrust vectoring vertical take-off and landing aircraft, and vertical take-off and landing conversion kits.

§ I. VTOL Aircraft with Tilted VTOL Yaw Control Rotors

Referring in relevant part to FIGS. 1-4, illustrated is a vertical take-off and landing (VTOL) aircraft 50 including an airframe 60 that includes fuselage 61, fixed left and right wings 62 and 63, tail assembly or empennage 65, left and right tail boom supports 70 and 71, and left and right head boom supports 72 and 73. Left and right wings 62 and 63 are fixed to fuselage 61, and so airframe 60 is exemplary of a fixed wing airframe. Fuselage 61 has front or leading end/extremity 61A and an opposed rear or trailing end/extremity 61B, and opposed left and right sides 61C and 61D extending from front or leading extremity 61A trailing extremity 61B. Left wing 62 and right wing 63 are applied to fuselage 61 and are airfoils that produce lift for flight of aircraft 50 through the atmosphere. Left wing 62 has a left leading edge 62A and an opposed left trailing edge 62B, and a left top surface 62C and an opposed left bottom surface 62D that extend between left leading and trailing edges 62A and 62B. Right wing 63 has a right leading edge 63A and an opposed right trailing edge 63B, and a right top surface 63C and an opposed right bottom surface 63D that extend between right leading and trailing edges 63A and 63B. Left and right wings 62 and 63 are the mirror image of one another, and left wing 62 has a thickness or wing thickness extending from top surface 62C to bottom surface 62D, and right wing 63 has a thickness or wing thickness extending from top surface 63C to bottom surface 63D. The wing thickness of left wing 62 is the same as the wing thickness of right wing 63. During flight, a region of lower-than-normal air pressure is generated over top surfaces 62C and 63C of left and right wings 62 and 63, with a higher pressure existing on bottom surfaces 62D and 63D of left and right wings 62 and 63. The lower air pressure on top surfaces 62C and 63C of left and right wings 62 and 63 generates a smaller downward force on the top surfaces 62C and 63C of left and right wings 62 and 63 than the upward force generated by the higher air pressure on the bottom surfaces 62D and 63D of left and right wings 62 and 63. Hence, a net upward force acts on the left and right wings 62 and 63 to generate lift by the left and right wings 62 and 63. Leading extremity 61A of fuselage 61 is formed with a pitot/static tube 75. Left wing 62 is applied to and extends from left side 61C of fuselage 61 proximate to trailing extremity 61B and right wing 63 is applied to and extends from right side 61D of fuselage 61 proximate to trailing extremity 61B. A left aileron 80 is retained pivotally on a rear of left wing 62 near trailing edge 62B of left wing 62 near the outer or distal extremity of left wing 62, and a right aileron 81 is retained pivotally on a rear of right wing 63 near trailing edge 63B of right wing 63 near the outer or distal extremity of right wing 63. Forward thrust rotor 85 is mounted to rear extremity 61B of fuselage 61 between rear extremity 61B and empennage 65 and is capable of providing forward thrust to aircraft 50.

Empennage 65 is the rear part of airframe 60 of aircraft 50, gives stability to aircraft 50, and is located behind and is spaced-apart rearwardly from trailing extremity 61B of fuselage 61. In this embodiment, empennage 65 is exemplary of a twin tail assembly or twin tail empennage including left vertical stabilizer 90, right vertical stabilizer 91, and horizontal stabilizer 92 extending between left and right vertical stabilizers 91 and 91. Left tail boom support 70 and right tail boom support 71 of airframe 60 are coupled between the left and right wings 62 and 63, respectively, and empennage 65. Left tail boom support 70 and right tail boom support 71 support or otherwise carry empennage 65. Left tail boom support 70 and right tail boom support 71 are identical being coextensive and equal in size and shape. Left tail boom support 70 is located along left side 61C of fuselage 61, and is spaced-apart from, or is otherwise located outboard of, left side 61C of fuselage 61 and is parallel with respect to fuselage 61. Right tail boom support 71 is located along right side 61D of fuselage 61, and is spaced-apart from, or is otherwise located outboard of, right side 61D of fuselage 61 and is parallel with respect to fuselage 61. Left and right tail boom supports 70 and 71 are further parallel with respect to each other.

Left tail boom support 70 extends rearward from left wing 62 and trailing edge 62B of left wing 62 to left stabilizer 90 of empennage 65, and right tail boom support 71 extends rearward from right wing 63 and trailing edge 63B of right wing 63 to right stabilizer 91 of empennage 65. Left stabilizer 90 extends upward from a rear of left tail boom support 70, and right stabilizer 91 extends upward from a rear of right tail boom support 71. Horizontal stabilizer 92 is retained between left and right tail boom supports 70 and 71. A rudder 95 is retained pivotally on a rear of left stabilizer 90, and a rudder 96 is retained pivotally on a rear of right stabilizer 91. An elevator 97 is retained pivotally on a rear of horizontal stabilizer 92.

Left head boom support 72 is coupled to left wing 62, and right head boom support 73 is coupled to right wing 63. Left head boom support 72 extends forward from left wing 62 and leading edge 62A of left wing 62 to an outer end 100 in FIG. 3, and right head boom support 73 extends forward from right wing 63 and leading edge 63A of right wing 63 to an outer end 101 in FIG. 3. Left head boom support 72 and right head boom support 73 are parallel with respect to each other, and are identical being coextensive and equal in size and shape. Left head boom support 72 is located along left side 61C of fuselage 61, and is spaced-apart from, or is otherwise located outboard of, left side 61C of fuselage 61 and is parallel with respect to fuselage 61. Right head boom support 73 is located along right side 61D of fuselage 61, and is spaced-apart from, or is otherwise located outboard of, right side 61D of fuselage 61 and is parallel with respect to fuselage 61.

Left head boom support 72 of airframe 60 is in-line and co-axial with respect to left tail boom support 70, and right head boom support 73 of airframe 60 is in-line and co-axial with respect to right tail boom support 71. Left tail boom support 70 and left head boom support 72 define either end of a left boom connected along the underside of left wing 62. Right tail boom support 71 and right head boom support 73 define either end of a right boom connected along the underside of right wing 63. The right and left boom are parallel relative to each other and to the long axis of fuselage 61.

Aircraft 50 is formed with a VTOL propulsion system, or simply a VTOL system, which is a quadrotor VTOL system including four VTOL rotors including a left front VTOL thrust rotor 110, a left rear VTOL thrust rotor 111, a right front VTOL thrust rotor 112, and a right rear VTOL thrust rotor 113, all of which are mounted to, and carried by, airframe 60, and which provide downward thrust to provide vertical lift to aircraft 50 and yaw control authority. Left front VTOL thrust rotor 110 and left rear VTOL thrust rotor 111 define one set of VTOL thrust rotors of aircraft 50 proximate to left side 61C of fuselage 61. Right front VTOL thrust rotor 112 and right rear VTOL thrust rotor 113 define another set of VTOL thrust rotors of aircraft 50 proximate to right side 61D of fuselage 61. VTOL thrust rotors 110-113 are open VTOL thrust rotors and are mounted to airframe 60 of aircraft 50 in a quadrotor pattern for providing vertical lift and yaw control authority to aircraft 50 as will be explained in detail below. VTOL thrust rotors 110-113 are identical and coextensive being equal in size and shape and are capable of providing vertical lift and yaw control authority to aircraft 50 so as to be useful by aircraft 50 in performing VTOL maneuvers. Left front and rear VTOL thrust rotors 110 and 111 are located outboard of left side 61C of fuselage 61 between leading extremity 61A of fuselage 61 and empennage 65, and right front and rear VTOL thrust rotors 112 and 113 are located outboard of right side 61D of fuselage 61 between leading extremity 61A of fuselage 61 and empennage 65.

Left front VTOL thrust rotor 110 is mounted to and atop left head boom support 72 of airframe 60 along the left side 61C of fuselage 61 and is positioned forwardly of leading edge 62A of left wing 62 outboard of left side 61C of fuselage 61 near leading extremity 61A of fuselage 61 and is positioned near left side 61C of fuselage 61 between left side 61C of fuselage 61 and the outer or distal extremity of left wing 62 formed with aileron 80. Left rear VTOL thrust rotor 111 is mounted to and atop left tail boom support 70 of airframe 60 along the left side 61C of fuselage 61 and is positioned rearwardly of trailing edge 62B of left wing 62 outboard of left side 61C of fuselage 61 near trailing extremity 61B of fuselage 61 and is positioned near left side 61C of fuselage 61 between left side 61C of fuselage 61 and the outer or distal extremity of left wing 62 formed with aileron 80.

Right front VTOL thrust rotor 112 is mounted to and atop right head boom support 73 of airframe 60 along the right side 61D of fuselage 61 and is positioned forwardly of leading edge 63A of right wing 63 outboard of right side 61D of fuselage 61 near leading extremity 61A of fuselage 61 and is positioned near right side 61D of fuselage 61 between right side 61D of fuselage 61 and the outer or distal extremity of right wing 63 formed with aileron 81. Right rear VTOL thrust rotor 113 is mounted to and atop right tail boom support 71 of airframe 60 along the right side 61D of fuselage 61 and is positioned rearwardly of trailing edge 63B of right wing 63 outboard of right side 61D of fuselage 61 near trailing extremity 61B of fuselage 61 and is positioned near right side 61D of fuselage 61 between right side 61D of fuselage 61 and the outer or distal extremity of right wing 63 formed with aileron 81.

Left front VTOL thrust rotor 110 is forward of leading edge 62A of left wing 62 and is mounted to and atop left head boom support 72 between leading edge 62A of left wing 62 and outer end 100 of left head boom support 72. Right front VTOL thrust rotor 112 is forward of leading edge 63A of right wing 63 and is mounted to and atop right head boom support 73 between leading edge 63A of right wing 63 and outer end 101 (shown only in FIG. 3) of right head boom support 73. Left front VTOL thrust rotor 110 and right front VTOL thrust rotor 112 are equidistant from, or otherwise with respect to, left and right wings 62 and 63, respectively, and fuselage 61.

Left rear VTOL thrust rotor 111 is rearward of trailing edge 62B of left wing 62 and is mounted to and atop left tail boom support 70 between trailing edge 62B of left wing 62, and empennage 65 and, more specifically, left vertical stabilizer 90 of empennage 65. Right rear VTOL thrust rotor 113 is rearward of trailing edge 63B of right wing 63 and is mounted to and atop right tail boom support 71 between trailing edge 63B of right wing 63, and empennage 65 and, more specifically, right vertical stabilizer 91 of empennage 65. Left rear VTOL thrust rotor 111 and right rear VTOL thrust rotor 113 are equidistant from, or otherwise with respect to, left and right wings 62 and 63, respectively, and fuselage 61.

Figure 2:
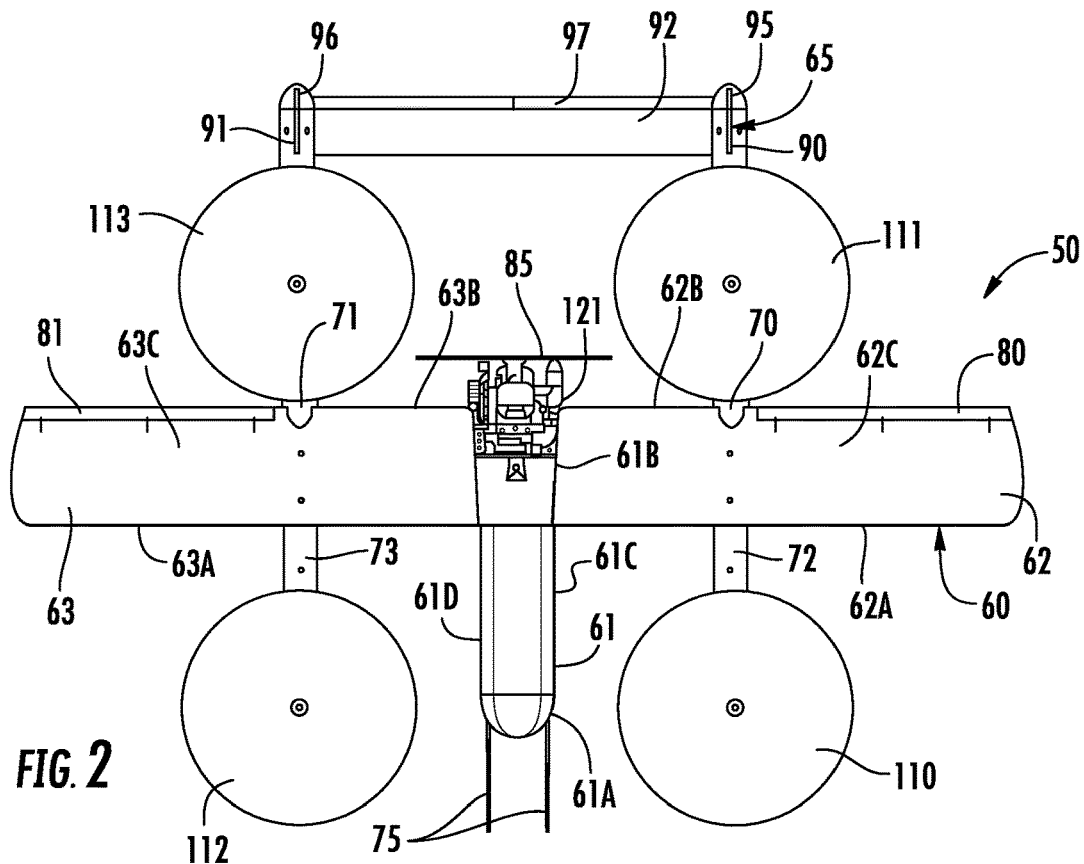
FIG. 2 is a top plan view of the embodiment of FIG. 1.

As best seen in FIG. 2, left front VTOL thrust rotor 110 diametrically opposes right front VTOL thrust rotor 112 proximate to leading extremity 61A of fuselage 61, and left rear VTOL thrust rotor 111 diametrically opposes right rear VTOL thrust rotor 113 proximate to trailing extremity 61B of fuselage 61. Left front VTOL thrust rotor 110 is in-line with respect to left rear VTOL thrust rotor 111, and right front VTOL thrust rotor 112 is in-line with respect to right rear VTOL thrust rotor 113.

Left front VTOL thrust rotor 110 and left rear VTOL thrust rotor 111 of the first set of VTOL thrust rotors of aircraft 50 proximate to left side 61C of fuselage 61 are identically laterally tilted from horizontal outwardly to the left to direct their thrust downwardly under fuselage 61 inwardly toward left side 61C of fuselage 61. Right front VTOL thrust rotor 112 and right rear VTOL thrust rotor 113 of the second set of VTOL thrust rotors of aircraft 50 proximate to right side 61D of fuselage 61 are identically laterally tilted from horizontal outwardly to the right to direct their thrust downwardly under fuselage 61 inwardly toward right side 61D of fuselage 61. The tilt of the left front and rear VTOL thrust rotors 110 and 111 of the first set of VTOL thrust rotors of aircraft 50 is the mirror image of the tilt of the right front and rear VTOL thrust rotors 112 and 113 of the second set of VTOL thrust rotors of aircraft 50. Left front VTOL thrust rotor 110 and left rear VTOL thrust rotor 111 of the first set of VTOL thrust rotors of aircraft 50 proximate to left side 61C of fuselage 61 are not tilted forwardly or rearwardly, but rather are laterally tilted from horizontal with respect to fuselage 61 so as to direct their respective thrusts downwardly under fuselage 61 inwardly toward left side 61C of fuselage 61 without providing forward or rearward thrust. Right front VTOL thrust rotor 112 and right rear VTOL thrust rotor 113 of the second set of VTOL thrust rotors of aircraft 50 proximate to right side 61D of fuselage 61 are likewise not tilted forwardly or rearward, but rather are laterally tilted from horizontal with respect to fuselage 61 so as to direct their respective thrusts downwardly under fuselage 61 inwardly toward right side 61D of fuselage 61 without providing forward or rearward thrust.

Figure 3:
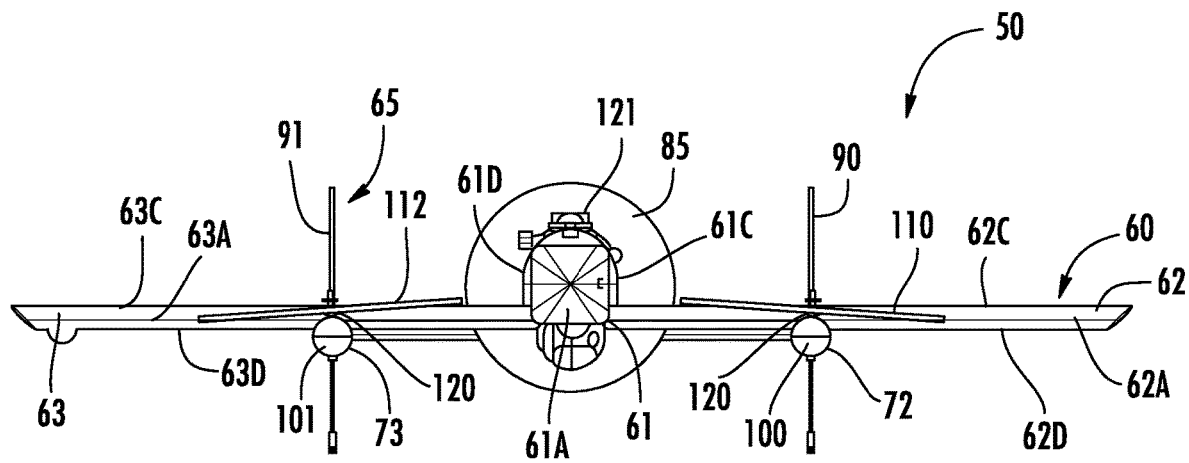
FIG. 3 is a front elevation view of the embodiment of FIG. 1 illustrating rotors as they would appear tilted outwardly.
Figure 4:
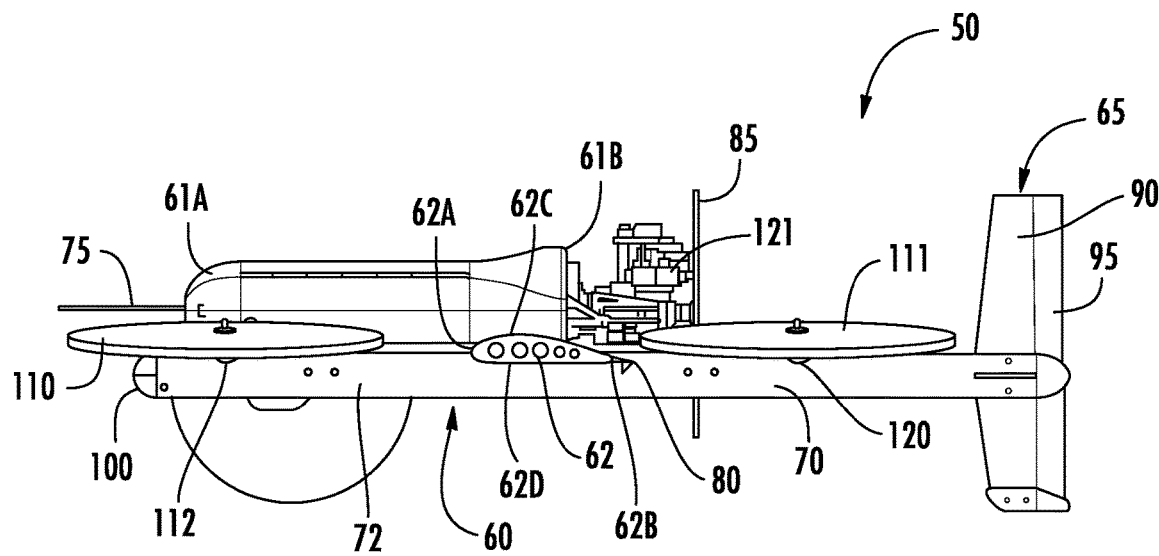
FIG. 4 is a left side elevation view of the embodiment of FIG. 1.

FIG. 3 is a front elevation view of aircraft 50 showing the lateral tilt of left front VTOL thrust rotor 110 and the mirror image lateral tilt of right front VTOL thrust rotor 111. In FIG. 3, left front VTOL thrust rotor 110 is laterally tilted four degrees from horizontal outwardly to the left to direct its thrust downwardly under fuselage 61 inwardly to the right at an angle of four degrees from horizontal toward left side 61C of fuselage 61, and right front VTOL thrust rotor 112 is laterally tilted four degrees from horizontal outwardly to the right to direct its thrust downwardly under fuselage 61 inwardly to the left at an angle of four degrees from horizontal toward right side 61D of fuselage 61. Identically, left rear VTOL thrust rotor 111 is laterally tilted four degrees from horizontal outwardly to the left to direct its thrust downwardly under fuselage 61 inwardly to the right at an angle of four degrees from horizontal toward left side 61C of fuselage 61, and right rear VTOL thrust rotor 113 is laterally tilted four degrees from horizontal outwardly to the right to direct its thrust downwardly under fuselage 61 inwardly to the left at an angle of four degrees from horizontal toward right side 61D of fuselage 61.

According to this arrangement, left front VTOL thrust rotor 110 and left rear VTOL thrust rotor 111 provide downward thrust under aircraft 50 inwardly to the right, at an angle of four degrees from horizontal in this embodiment, toward left side 61C of fuselage 61 of aircraft 50 for providing vertical lift and fore and aft lateral thrust components for providing yaw control authority to aircraft 50 along left side 61C of fuselage 61 of aircraft 50, and right front VTOL thrust rotor 112 and right rear VTOL thrust rotor 113 provide downward thrust under aircraft 50 inwardly to the left, at an angle of four degrees from horizontal in this embodiment, toward right side 61D of fuselage 61 of aircraft 50 for providing vertical lift and fore and aft lateral thrust components for providing yaw control authority to aircraft 50 along right side 61D of fuselage 61 of aircraft 50. During flight of aircraft 50, increasing and decreasing thrust of left front VTOL thrust rotor 110 produces a front yaw control authority on left side 61C of fuselage 61 proximate to leading extremity 61A of fuselage 61 of aircraft 50, increasing and decreasing thrust of left rear VTOL thrust rotor 111 produces a rear yaw control authority on left side 61C of fuselage 61 proximate to trailing extremity 61B of fuselage 61 of aircraft 50, increasing and decreasing thrust of right front VTOL thrust rotor 112 produces a front yaw control authority on right side 61D of fuselage 61 proximate to leading extremity 61A of fuselage 61 of aircraft 50, and increasing and decreasing thrust of right rear VTOL thrust rotor 113 produces a rear yaw control authority on right side 61D of fuselage 61 proximate to trailing extremity 61B of fuselage 61 of aircraft 50. The lateral tilts of the lifting VTOL rotors 110-113 provide lateral thrust components for providing responsive and nimble yaw control authority for aircraft 50.

In alternate embodiments, left front VTOL thrust rotor 110, left rear VTOL thrust rotor 111, right front VTOL thrust rotor 112, and right rear VTOL thrust rotor 113 can be laterally tilted less or more than four degrees from horizontal for directing thrust from left front and rear VTOL thrust rotors 110 and 111 downwardly under fuselage 61 to provide vertical lift and inwardly to the right at a selected angle toward left side 61C of fuselage 61 for yaw control authority, and for directing thrust from right front and rear VTOL thrust rotors 112 and 113 downwardly under fuselage 61 to provide vertical lift and inwardly to the left at a selected angle toward right side 61D of fuselage 61 for yaw control authority.

VTOL thrust rotors 110-113 are each completely exposed and not surrounded and housed within thruster housings or casings. As such, VTOL thrust rotors 110-113 are "open" thrust rotors being free of thruster housings or casings, which prevents buffeting from occurring in response to the activation of VTOL thrust rotors 110-113 during operation, e.g., VTOL maneuvering.

VTOL thrust rotors 110-113 are each driven for rotation by an electric motor 120. The electric motors 120 receive electrical power from a battery pack onboard fuselage 61. Electric motors 120 are electrically coupled to battery pack housed in fuselage 61 with conventional, onboard electrical wiring. The battery pack is formed with batteries, super capacitors or other like or similar battery-like technology as is customary in the art. Forward thrust rotor 85 is driven for rotation by an internal combustion engine 121. Internal combustion engine 121 is fueled by fuel housed in one or more fuel tanks onboard fuselage 61. Internal combustion engine 121 is coupled in fuel communication with the one or more fuel tanks with one or more conventional, onboard fuel lines as is customary in the art. The battery pack that powers electric motors 120 is customarily rechargeable, and can be recharged by a generator. Aircraft 50 can be configured with a generator for recharging the battery pack. Such an onboard generator for recharging the battery pack can be coupled to internal combustion engine 121.

Aircraft 50 is an unmanned aerial vehicle (UAV) or drone, and is furnished with onboard UAV or drone autopilot avionics and navigation package (ANP) housed in fuselage 61. The ANP is operated by remote control of a navigator or pilot for remotely controlling the operation of aircraft 50, including the electric motors for activating and deactivating VTOL thrust rotors 110-113 and for increasing and decreasing the thrust of left front and rear VTOL thrust rotors 110 and 111 for vertical lift and yaw control authority and for increasing and decreasing the thrust of right front and rear VTOL thrust rotors 112 and 113 for vertical lift and yaw control authority, for activating and deactivating internal combustion engine 121 for activating and deactivating forward thrust rotor 85, for controlling rudders 70 and 71 and ailerons 56 and 57 for controlling aircraft 50 flight, and other onboard aircraft 50 systems. The ANP can be an autonomous system, a self-directing system to provide autonomous control of the operation of aircraft 50. The ANP receives electrical power from the onboard aircraft 50 battery pack, and the ANP is electrically coupled to the onboard aircraft 50 battery pack with conventional, onboard electrical wiring. The ANP can have a combined partially manual and partially autonomous mode. In this mode, the manual pilot provides angle commands while the autopilot provides low-level stability and control, including yaw controlling.

VTOL thrust rotors 110-113 provide for vertical take-off and lift and left and right yaw control authority without providing forward or rearward thrust, and forward thrust rotor 85 provides for forward thrust during flight. VTOL thrust rotors 110-113 are powered by electric motors 120, respectively, which, in turn, are electrically powered by the vehicle onboard battery pack, which together form an electric powered VTOL system in aircraft 50, which is operated through the ANP, such as by a remote pilot or operator, or autonomously. To provide four axis of control (roll, pitch, yaw, and vertical thrust), VTOL thrust rotors 110-113 are controlled by a mixture of control inputs to all four rotors to effect control about each of the four axis independently. Preferably, VTOL thrust rotors 110 and 111 rotate in the same direction of rotation and VTOL thrust rotors 112 and 113 rotate in the opposite direction of rotation relative to the direction of rotation of VTOL thrust rotors 110 and 111 for providing differential torque between the respective pairs thrust rotors and yawing moments. Due to the lateral tilts of the lifting VTOL rotors 110-113, yaw control provided by the differential torque is augmented by the lateral thrust components of the VTOL thrust rotors 110-113 providing responsive and nimble yaw control authority. The direction of rotation of the thrust rotors 110-113 as described is thus chosen to match or otherwise correspond to the inwardly/outwardly tilted positons so as to combine their yaw-moment inducing forces to the control authority.

Forward thrust rotor 85 is powered by internal combustion engine 121 to provide maximize endurance during forward flight of aircraft 50, which is operated through the ANP, such as by a remote pilot or operator, or autonomously. In an alternate UAV configuration according to an alternate embodiment of the invention, forward thrust rotor 85 can be powered by an electric motor like VTOL thrust rotors 110-113. Aircraft 50 has four VTOL thrust rotors 110-113 and is exemplary of a quadrotor system as described herein.

When performing VTOL maneuvers, VTOL thrust rotors 110-113 are activated for rotation to provide vertical lift through the activation of corresponding electric motors 120. In forward flight, forward thrust rotor 85 is activated for rotation to provide forward thrust through the activation of internal combustion engine 121. The thrust of VTOL thrust rotors 110-113 can be increased and decreased to provide vertical lift, pitch, roll, and yaw. The thrust of left front VTOL thrust rotor 110 can be increased and decreased to produce pitch, roll, and front yaw control authority on left side 61C of fuselage 61 proximate to leading extremity 61A of fuselage 61 of aircraft 50, the thrust of left rear VTOL thrust rotor 111 can be increased and decreased to produce pitch, roll, and rear yaw control authority on left side 61C of fuselage 61 proximate to trailing extremity 61B of fuselage 61 of aircraft 50, the thrust of right front VTOL thrust rotor 112 can be increased and decreased to produce pitch, roll, and front yaw control authority on right side 61D of fuselage 61 proximate to leading extremity 61A of fuselage 61 of aircraft 50, and the thrust of right rear VTOL thrust rotor 113 can be increased and decreased to produce pitch, roll, and rear yaw control authority on right side 61D of fuselage 61 proximate to trailing extremity 61B of fuselage 61 of aircraft 50. In VTOL maneuvering of aircraft 50 with the activation of VTOL thrust rotors 110-113, forward thrust rotor 85 is activated to provide forward thrust so as to compensate for wind, and to provide forward acceleration to a predetermined fixed-wing flight speed, at which point VTOL thrust rotors 110-113 remain activated to provide lift to assist with vertical lift and to provide selected yaw control authority to aircraft 50.

Aircraft 50 incorporates a proportional-integral-derivative controller (PID controller) based control system that outputs desired moments about the three aircraft axes (pitch, roll, yaw), as well as the total thrust desired. The PID controller implements a control saturation scheme that operates the aircraft at thrust saturation (i.e., maximum thrust capacity), while still providing control in pitch, roll, and yaw. Parameters exist which define the maximum percentage of moment which can be applied to each axis, pitch, roll, and yaw. Staring with all four VTOL rotors 110-113 at 50% thrust, a roll moment set to a preselected limit is applied. For example, if +10% roll moment is commanded, then the thrust of left front and rear VTOL rotors 110 and 111 are increased 5% and the thrust of the right front and rear VTOL thrust rotors 112 and 113 are decreased 5%. The pitch moment, limited to a defined limit, is then applied. The yaw moment, also set to defined limits, is applied. Last, the total thrust command is applied. The total thrust command is limited such that no motor is commanded over 100% or under 0%. This means that the total thrust provided by the combined VTOL thrust rotors 110-113 can be more or less than the thrust PID loop's commanded value. In this way, priority is given in order to pitch, roll, yaw, and thrust commands. When the total thrust required is too large to maintain both vertical position and control about the three axes, thrust is reduced so as to maintain attitude control, and allows for a smaller thrust overhead. Although this has been described for a quadrotor, it can be applied to other multi-rotor systems in which the three moments and vertical thrust can be mapped to individual motor commands. A similar saturation scheme can be implemented with each aircraft embodiment disclosed herein. The order of the control priority, described herein as pitch, roll, yaw, and thrust, can be selectively changed to suit the needs of the given aircraft.

In the present embodiment, left front VTOL thrust rotor 110 and left rear VTOL thrust rotor 111 outboard of left side 61C of fuselage 61 of aircraft 50 are identically laterally tilted outwardly to the left from horizontal for directing thrust downwardly under fuselage 61 to provide vertical lift and inwardly to the right at a selected angle toward left side 61C of fuselage 61 for yaw control authority, and right front VTOL thrust rotor 112 and right rear VTOL thrust rotor 113 outboard of right side 61D of fuselage 61 of aircraft 50 are identically laterally tilted outwardly to the right from horizontal for directing thrust downwardly under fuselage 61 to provide vertical lift and inwardly to the left at a selected angle toward right side 61D of fuselage 61 for yaw control authority. In an alternate embodiment in FIG. 4A, left front VTOL thrust rotor 110 and left rear VTOL thrust rotor 111 outboard of left side 61C of fuselage 61 of aircraft 50 can be identically laterally tilted inwardly to the right from horizontal for directing thrust downwardly under fuselage 61 to provide vertical lift and outwardly to the left at a selected angle away from left side 61C of fuselage 61 for yaw control authority, and right front VTOL thrust rotor 112 and right rear VTOL thrust rotor 113 outboard of right side 61D of fuselage 61 of aircraft 50 can be identically laterally tilted inwardly to the left from horizontal for directing thrust downwardly under fuselage 61 to provide vertical lift and outwardly to the right at a selected angle away from right side 61D of fuselage 61 for yaw control authority. In this embodiment, left front VTOL thrust rotor 110, left rear VTOL thrust rotor 111, right front VTOL thrust rotor 112, and right rear VTOL thrust rotor 113 are laterally tilted inwardly four degrees form horizontal, and can be laterally tilted inwardly less or more than four degrees to provide vertical lift yaw control authority in alternate embodiments.

To enable movement of the rotors between the outwardly and inwardly tilted positions, thrust rotors 110-113 are each mounted to a pivoting engine pod which is actuated to laterally pivot each thrust rotor back-and-forth from its inwardly laterally tilted position to its outwardly laterally tilted position. Each pivoting engine pod is conventional and is conventionally operated to provide the thrust rotor laterally tilting. The pivoting engine pods can each be actuated to position each one of thrust rotors 110-113 in horizontal position relative the inwardly and outwardly tilted positions. FIG. 4B illustrates left front VTOL thrust rotor 110 and right front VTOL thrust rotor 112 as they would each appear in a horizontal position. Selective yaw control is affected by selectively adjusting thrust rotors 110-113 between their outwardly and inwardly tilted positions.

§ II. VTOL Aircraft with VTOL Thrust Rotors and Yaw Control Thrust Rotors

Referring now in relevant part to FIGS. 5-9, illustrated is another embodiment of a VTOL aircraft 150. Although aircraft 150 has a somewhat different design than aircraft 50, aircraft 150 is structurally common to aircraft 50 in that aircraft 150 shares airframe 60, fuselage 61 having left and right sides leading and trailing extremities 61A and 61B and left and right sides 61C and 61D, fixed left wing 62 including left leading edge 62A, left trailing edge 62B, left top surface 62C, and left bottom surface 62D, fixed right wing 63 including right leading edge 63A, right trailing edge 63B, right top surface 63C, and right bottom surface 63D, tail assembly or empennage 65, left and right tail boom supports 70 and 71, left and right head boom supports 72 and 73, left aileron 80, right aileron 81, forward thrust rotor 85, and a VTOL propulsion system including left front VTOL thrust rotor 110, left rear VTOL thrust rotor 111, right front VTOL thrust rotor 112, and right rear VTOL thrust rotor 113. In this embodiment, VTOL thrust rotors 110-113 are each horizontal for providing vertical lift to aircraft 50 for VTOL maneuvering of aircraft 150. VTOL thrust rotors 110-113 are each completely exposed and not surrounded and housed within thruster housings or casings. As such, VTOL thrust rotors 110-113 are "open" thrust rotors being free of thruster housings or casings, which prevents buffeting from occurring in response to the activation of VTOL thrust rotors 110-113 during operation, e.g., VTOL maneuvering.

In aircraft 150, left front VTOL thrust rotor 110, left rear VTOL thrust rotor 111, right front VTOL thrust rotor 112, and right rear VTOL thrust rotor 113 are coplanar being and operating in the same plane, and this plane is horizontal relative to airframe 60 of aircraft 50 and, more specifically, is parallel relative to, and being even/level with, top surfaces 62C and 63C of left and right wings 62 and 62 in and around the region of each of rotors 110-113, and VTOL thrust rotors 110-113 each do not extend downwardly past the aforementioned plane past top surfaces 62C and 63C of left and right wings 62 and 63 so as to reside within the wing thicknesses of left and right wings 62 and 63 between top surfaces 62C and 63C and bottom surfaces 62D and 63D of left and right wings 62 and 63.

Left front VTOL thrust rotor 110 and left rear VTOL thrust rotor 111 are coplanar being and operating in the same or common horizontal plane that is parallel with respect to, and being even or otherwise level with, the top surface 62C of left wing 62 in and around the region of left front and left rear VTOL thrust rotors 110 and 111, in which VTOL thrust rotors 110 and 111 each do not extend downwardly from the aforementioned plane past top surface 62C of left wing 62 so as to reside within the wing thickness of left wing 62 between top surface 62C and bottom surface 62D of left wing 62. In other words, left front VTOL thrust rotor 110 and left rear VTOL thrust rotor 111 are coplanar being and operating in the same or common horizontal plane denoted at P1 that is parallel with respect to, and being even or otherwise level with, the top surface 62C of left wing 62 in and around the region of left front and left rear VTOL thrust rotors 110 and 111, and VTOL thrust rotors 110 and 111 each do not reside within the wing thickness of left wing 62 between top surface 62C and bottom surface 62D of left wing 62. Identically to that of left front and left rear VTOL thrust rotors 110 and 111 relative to top surface 62C of left wing 62, right front VTOL thrust rotor 112 and right rear VTOL thrust rotor 113 are coplanar being and operating in the same or common horizontal plane that is parallel with respect to, and being even or otherwise level with, the top surface 63C of right wing 63 in and around the region of right front and right rear VTOL thrust rotors 112 and 113, in which VTOL thrust rotors 112 and 113 each do not extend downwardly from the aforementioned plane past top surface 63C of right wing 63 so as to reside within the wing thickness of right wing 63 between top surface 63C and bottom surface 63D of right wing 63. In other words, right front VTOL thrust rotor 112 and right rear VTOL thrust rotor 113 are coplanar being and operating in the same or common horizontal plane that is parallel with respect to, and being even or otherwise level with, the top surface 63C of right wing 63 in and around the region of right front and right rear VTOL thrust rotors 112 and 113, and VTOL thrust rotors 112 and 113 each do not reside within the wing thickness of right wing 63 between top surface 63C and bottom surface 63D of right wing 63. Furthermore, forward thrust rotor 85 is perpendicular relative to VTOL rotors 110-113, and is furthermore perpendicular relative to the aforementioned plane in which left front and rear VTOL rotors 110 and 111 reside and the aforementioned plane in which right front and rear VTOL rotors 112 and 113 reside and, accordingly, the common horizontal plane in which VTOL rotors 110-113 reside.

The VTOL propulsion system of aircraft 150 further includes yaw control (YC) thrust rotors including a left front YC thrust rotor 160, a left rear YC thrust rotor 161, a right front YC thrust rotor 162, and a right rear YC thrust rotor 163, all of which are mounted to, and carried by, airframe 60, and which are capable of providing vertical lift to aircraft 50 and yaw control authority. Left front YC thrust rotor 160 and left rear YC thrust rotor 161 define one set of YC thrust rotors of aircraft 50 proximate to left side 61C of fuselage 61. Right front YC thrust rotor 162 and right rear YC thrust rotor 163 define another set of YC thrust rotors of aircraft 50 proximate to right side 61D of fuselage 61. YC thrust rotors 160-163 are open YC thrust rotors and are mounted to airframe 60 of aircraft 50 in a quadrotor pattern for providing vertical lift and yaw control authority to aircraft 50 as will be explained in detail below. YC thrust rotors 160-163 are identical and coextensive being equal in size and shape and are capable of providing vertical lift and yaw control authority to aircraft 150 so as to be useful by aircraft 150 in performing VTOL maneuvers. Left front and rear VTOL thrust rotors 110 and 111 are located outboard of left side 61C of fuselage 61 between leading extremity 61A of fuselage 61 and empennage 65, and right front and rear VTOL thrust rotors 112 and 113 are located outboard of right side 61D of fuselage 61 between leading extremity 61A of fuselage 61 and empennage 65.

Left front YC thrust rotor 160 is mounted to and depends downwardly from the underside of left head boom support 72 of airframe 60 along the left side 61C of fuselage 61 and is positioned forwardly of leading edge 62A of left wing 62 outboard of left side 61C of fuselage 61 near leading extremity 61A of fuselage 61 and is positioned under left front VTOL thrust rotor 110 near left side 61C of fuselage 61 between left side 61C of fuselage 61 and the outer or distal extremity of left wing 62 formed with aileron 80. Left rear YC thrust rotor 161 is mounted to and depends downwardly from the underside of left tail boom support 70 of airframe 60 along the left side 61C of fuselage 61 and is positioned rearwardly of trailing edge 62B of left wing 62 outboard of left side 61C of fuselage 61 near trailing extremity 61B of fuselage 61 and is positioned under left rear VTOL thrust rotor 111 near left side 61C of fuselage 61 between left side 61C of fuselage 61 and the outer or distal extremity of left wing 62 formed with aileron 80.

Right front YC thrust rotor 162 is mounted to and depends downwardly from the underside of right head boom support 73 of airframe 60 along the right side 61D of fuselage 61 and is positioned forwardly of leading edge 63A of right wing 63 outboard of right side 61D of fuselage 61 near leading extremity 61A of fuselage 61 and is positioned under right front VTOL thrust rotor 112 near right side 61D of fuselage 61 between right side 61D of fuselage 61 and the outer or distal extremity of right wing 63 formed with aileron 80. Right rear YC thrust rotor 163 is mounted to and depends downwardly from the underside of right tail boom support 71 of airframe 60 along the right side 61D of fuselage 61 and is positioned rearwardly of trailing edge 63B of right wing 63 outboard of right side 61D of fuselage 61 near trailing extremity 61B of fuselage 61 and is positioned under right rear VTOL thrust rotor 113 near right side 61D of fuselage 61 between right side 61D of fuselage 61 and the outer or distal extremity of right wing 63 formed with aileron 80.

Left front YC thrust rotor 160 is forward of leading edge 62A of left wing 62 and is mounted to and depends from the underside of left head boom support 72 between leading edge 62A of left wing 62 and outer end 100 of left head boom support 72 under left front VTOL thrust rotor 110. Right front YC thrust rotor 162 is forward of leading edge 63A of right wing 63 and is mounted to and depends from the underside of right head boom support 73 between leading edge 63A of right wing 63 and outer end 101 of right head boom support 73 under left rear VTOL thrust rotor 111. Left front YC thrust rotor 160 and right front YC thrust rotor 162 are equidistant from, or otherwise with respect to, left and right wings 62 and 63, respectively, and fuselage 61.

Left rear YC thrust rotor 161 is rearward of trailing edge 62B of left wing 62 and is mounted to and depends from the underside of left tail boom support 70 between trailing edge 62B of left wing 62, and empennage 65 and, more specifically, left vertical stabilizer 90 of empennage 65, and is positioned under left rear VTOL thrust rotor 111. Right rear YC thrust rotor 163 is rearward of trailing edge 63B of right wing 63 and is mounted to and depends from the underside of right tail boom support 71 between trailing edge 63B of right wing 63, and empennage 65 and, more specifically, right vertical stabilizer 91 of empennage 65, and is positioned under right rear VTOL thrust rotor 113. Left rear YC thrust rotor 161 and right rear YC thrust rotor 163 are equidistant from, or otherwise with respect to, left and right wings 62 and 63, respectively, and fuselage 61.

Left front YC thrust rotor 160 diametrically opposes right front YC thrust rotor 162 proximate to leading extremity 61A of fuselage 61, and left rear YC thrust rotor 161 diametrically opposes right rear YC thrust rotor 163 proximate to trailing extremity 61B of fuselage 61. Left front YC thrust rotor 160 is in-line with respect to left rear YC thrust rotor 161, and right front YC thrust rotor 162 is in-line with respect to right rear YC thrust rotor 163.

Left front YC thrust rotor 160 and left rear YC thrust rotor 161 of the first set of YC thrust rotors of aircraft 50 proximate to left side 61C of fuselage 61 are identically laterally tilted from horizontal inwardly to the right to direct their thrust downwardly under fuselage 61 outwardly to the left away from left side 61C of fuselage 61. Right front YC thrust rotor 162 and right rear YC thrust rotor 163 of the second set of YC thrust rotors of aircraft 150 proximate to right side 61D of fuselage 61 are identically laterally tilted from horizontal inwardly to the left to direct their thrust downwardly under fuselage 61 outwardly to the right away from right side 61D of fuselage 61. The tilt of the left front and rear YC thrust rotors 160 and 161 of the first set of YC thrust rotors of aircraft 50 is the mirror image of the tilt of the right front and rear YC thrust rotors 162 and 163 of the second set of YC thrust rotors of aircraft 50. Left front YC thrust rotor 160 and left rear YC thrust rotor 161 of the first set of YC thrust rotors of aircraft 50 proximate to left side 61C of fuselage 61 are not tilted forwardly or rearwardly, but rather are identically laterally tilted from horizontal inwardly to the right to direct their thrust downwardly under fuselage 61 outwardly to the left away from left side 61C of fuselage 61 without providing forward or rearward thrust. Right front YC thrust rotor 162 and right rear YC thrust rotor 163 of the second set of YC thrust rotors of aircraft 150 proximate to right side 61D of fuselage 61 are not tilted forwardly or rearwardly, but rather are identically laterally tilted from horizontal inwardly to the left to direct their thrust downwardly under fuselage 61 outwardly to the right away from right side 61D of fuselage 61 without providing forward or rearward thrust.

FIG. 8 is a front elevation view of aircraft 150 showing the lateral tilt of left front YC thrust rotor 160 and the mirror image lateral tilt of right front YC thrust rotor 161. In FIGS. 6, 8 and 10, left front YC thrust rotor 160 is laterally tilted four degrees from horizontal inwardly to the right to direct its thrust downwardly under fuselage 61 outwardly to the left at an angle of four degrees from horizontal away from left side 61C of fuselage 61, and in FIGS. 6 and 8 right front YC thrust rotor 112 is laterally tilted four degrees from horizontal inwardly to the left to direct its thrust downwardly under fuselage 61 outwardly to the right at an angle of four degrees from horizontal away from right side 61D of fuselage 61. Identically, in FIG. 6 left rear YC thrust rotor 111 is laterally tilted four degrees from horizontal inwardly to the right to direct its thrust downwardly under fuselage 61 outwardly to the left at an angle of four degrees from horizontal away from left side 61C of fuselage 61, and right rear YC thrust rotor 113 is laterally tilted four degrees from horizontal inwardly to the left to direct its thrust downwardly under fuselage 61 outwardly to the right at an angle of four degrees from horizontal away from right side 61D of fuselage 61.

According to this arrangement, left front YC thrust rotor 160 and left rear YC thrust rotor 161 provide downward thrust under aircraft 50 outwardly to the left, at an angle of four degrees from horizontal in this embodiment, away from left side 61C of fuselage 61 of aircraft 50 for providing vertical lift and fore and aft lateral thrust components for providing left yaw control authority to aircraft 50 along left side 61C of fuselage 61 of aircraft 50, and right front YC thrust rotor 162 and right rear YC thrust rotor 163 provide downward thrust under aircraft 50 outwardly to the right, at an angle of four degrees from horizontal in this embodiment, away from right side 61D of fuselage 61 of aircraft 50 for providing vertical lift and fore and aft lateral thrust components for providing right yaw control authority to aircraft 50 along right side 61D of fuselage 61 of aircraft 50. During flight of aircraft 50, increasing and decreasing thrust of left front YC thrust rotor 160 produces a front left yaw control authority on left side 61C of fuselage 61 proximate to leading extremity 61A of fuselage 61 of aircraft 150, increasing and decreasing thrust of left rear YC thrust rotor 161 produces a rear left yaw control authority on left side 61C of fuselage 61 proximate to trailing extremity 61B of fuselage 61 of aircraft 150, increasing and decreasing thrust of right front YC thrust rotor 162 produces a front right yaw control authority on right side 61D of fuselage 61 proximate to leading extremity 61A of fuselage 61 of aircraft 150, and increasing and decreasing thrust of right rear YC thrust rotor 163 produces a rear right yaw control authority on right side 61D of fuselage 61 proximate to trailing extremity 61B of fuselage 61 of aircraft 150. The lateral tilts of the yaw controlling YC rotors 160-163 provide lateral thrust components for providing responsive and nimble yaw control authority for aircraft 150.

In alternate embodiments, left front YC thrust rotor 160, left rear YC thrust rotor 161, right front YC thrust rotor 162, and right rear YC thrust rotor 163 can be laterally tilted less or more than four degrees from horizontal for directing thrust from left front and rear YC thrust rotors 160 and 161 downwardly under fuselage 61 to provide vertical lift and inwardly at a selected angle toward left side 61C of fuselage 61 for yaw control authority, and for directing thrust from right front and rear YC thrust rotors 162 and 163 downwardly under fuselage 61 to provide vertical lift and inwardly at a selected angle toward right side 61D of fuselage 61 for yaw control authority.

In the present embodiment, left front YC thrust rotor 160 and left rear YC thrust rotor 161 outboard of left side 61C of fuselage 61 of aircraft 150 are identically laterally tilted from horizontal inwardly to the right to direct their thrust downwardly under fuselage 61 outwardly to the left away from left side 61C of fuselage 61 for providing vertical lift and left yaw control authority to aircraft 150 along left side 61C of fuselage 61 of aircraft 150, and right front YC thrust rotor 162 and right rear YC thrust rotor 163 outboard of right side 61D of fuselage 61 of aircraft 150 are identically laterally tilted from horizontal inwardly to the left to direct their thrust downwardly under fuselage 61 outwardly to the right away from right side 61D of fuselage 61 for providing vertical lift and right yaw control authority to aircraft 150 along right side 61C of fuselage 61 of aircraft 150. In an alternate embodiment, left front YC thrust rotor 160 and left rear YC thrust rotor 161 outboard of left side 61C of fuselage 61 of aircraft 150 can be identically laterally tilted from horizontal outwardly to the left to direct their thrust downwardly under fuselage 61 inwardly to the right toward left side 61C of fuselage 61 for providing vertical lift and left yaw control authority to aircraft 150 along left side 61C of fuselage 61 of aircraft 150, and right front YC thrust rotor 162 and right rear YC thrust rotor 163 outboard of right side 61D of fuselage 61 of aircraft 150 can be identically laterally tilted from horizontal outwardly to the right to direct their thrust downwardly under fuselage 61 inwardly to the left toward right side 61D of fuselage 61 for providing vertical lift and right yaw control authority to aircraft 150 along right side 61C of fuselage 61 of aircraft 150.

To enable movement of the YC thrust rotors 160-163 between outwardly and inwardly tilted positions, they can each be mounted to a pivoting engine pod which is actuated to providing laterally pivoting from outwardly and inwardly tilted positions, and to horizontal positions relative the inwardly and outwardly tilted positions. Selective yaw control is affected by selectively adjusting YC thrust rotors 160-163 between their outwardly and inwardly tilted positions.

YC thrust rotors 160-163 are each completely exposed and not surrounded and housed within thruster housings or casings. As such, YC thrust rotors 160-163 are "open" thrust rotors being free of thruster housings or casings, which prevents buffeting from occurring in response to the activation of YC thrust rotors 160-163 during operation, e.g., YC maneuvering.

YC thrust rotors 160-163 are each driven for rotation by an electric motor. The electric motor that drives left front YC thrust rotor 160 is housed in left head boom support 72, the electric motor that drives left rear YC thrust rotor 161 is housed in left tail boom support 70, the electric motor that drives right front YC thrust rotor 162 is housed in right head boom support 73, the electric motor that drives right rear YC thrust rotor 163 is housed in right tail boom support 71. The electric motors that drive YC thrust rotors 160-163 receive electrical power from the battery pack onboard fuselage 61, and the onboard battery pack is electrically connected to the electric motors that drive YC thrust rotors 160-163 with conventional, onboard electrical wiring.

In FIGS. 5 and 7, forward thrust rotor 85 is driven for rotation by an internal combustion engine 170 carried by trailing extremity 61B of fuselage 61. In aircraft 150, trailing extremity 61B of fuselage 61 projects behind wings 62 and 63 to internal combustion engine 170. Internal combustion engine 170 is fueled by fuel housed in one or more fuel tanks onboard fuselage 61. Internal combustion engine 170 is coupled in fuel communication with the one or more fuel tanks with one or more conventional, onboard fuel lines as is customary in the art. The battery pack that powers electric motors 120 is customarily rechargeable, and can be recharged by a generator. Aircraft 150 can be configured with a generator for recharging the battery pack. Such an onboard generator for recharging the battery pack can be coupled to internal combustion engine 121.

Like aircraft 50 discussed above, aircraft 150 is an unmanned aerial vehicle (UAV) or drone, and is furnished with an onboard UAV or drone autopilot ANP housed in fuselage 61. The ANP is operated by remote control of a navigator or pilot for remotely controlling the operation of aircraft 150, including electric motors 160-163 for activating and deactivating YC thrust rotors 160-163 and for increasing and decreasing the thrust of left front and rear YC thrust rotors 160 and 161 for yaw control authority on the left side of aircraft 150 and for increasing and decreasing the thrust of right front and rear YC thrust rotors 162 and 163 for yaw control authority on the right side of aircraft 150, for activating and deactivating internal combustion engine 170 for activating and deactivating forward thrust rotor 85, the electric motors of VTOL thrust rotors 110-113 for activating and deactivating VTOL thrust rotors 110-113 for VTOL maneuvering, for controlling rudders 70 and 71 and ailerons 56 and 57 for controlling aircraft 150 flight, and other onboard aircraft 150 systems. Alternatively, the ANP can be an autonomous system, a self-directing system to provide autonomous control of the operation of aircraft 150. The ANP receives electrical power from the onboard aircraft 150 battery pack, and the ANP is electrically coupled to the onboard aircraft 150 battery pack with conventional, onboard electrical wiring. Again, the ANP can have a combined partially manual and partially autonomous mode. In this mode, the manual pilot provides angle commands while the autopilot provides low-level stability and control, including yaw controlling.

VTOL thrust rotors 110-113 provide for vertical take-off and lift, and YC thrust rotors 160-163 provide for vertical take-off and lift and left and right yaw control authority, and forward thrust rotor 85 provides for forward thrust during flight. VTOL thrust rotors 110-113 and YC thrust rotors 160-163 are powered by electric motors, respectively, which, in turn, are electrically powered by the vehicle onboard battery pack, which together form an electric powered VTOL system in aircraft 150, which is operated through the ANP, such as by a remote pilot or operator, or autonomously. In aircraft 150, VTOL thrust rotors 110-113 each have a size, and YC thrust rotors 160-163 each have a size. VTOL thrust rotors 110-113 are identically sized, and YC thrust rotors 160-163 are identically sized. The size of each one of VTOL thrust rotors 110-113 is greater than the size of each one of YC thrust rotors 160-163. Accordingly, VTOL thrust rotors 110-113 provide more vertical lift than YC thrust rotors 160-163. VTOL thrust rotors 110-113 provide sufficient vertical lift to lift aircraft 150 for VTOL maneuvering without assistance from YC thrust rotors 160-163. Because YC thrust rotors 160-163 are smaller in size to VTOL thrust rotors 110-113, YC thrust rotors 160-163 are insufficiently sized to lift aircraft 150 operating alone without the assistance of VTOL thrust rotors 110-113. Accordingly, VTOL thrust rotors 110-113 provide vertical lift to aircraft 150 without providing forward or rearward thrust, and YC thrust rotors 160-163, while they augment the vertical lift provided by VTOL thrust rotors 110-113, function primarily to provide yaw control authority to aircraft 150. Because VTOL thrust rotors 110-113 are larger than YC thrust rotors 160-163, VTOL thrust rotors 110-113 provide the majority of lift, and have inertias that are comparatively larger than the inertias of YC thrust rotors 160-163, which causes them to respond to control inputs slower than that of YC thrust rotors 160-163. And so the comparatively smaller YC thrust rotors 160-163 have smaller inertias than VTOL thrust rotors 110-113 and can inherently respond faster to control inputs for yaw control authority compared to VTOL thrust rotors 110-113.

To provide four axis of control (roll, pitch, yaw, and vertical thrust), YC thrust rotors 160-163 are controlled by a mixture of control inputs to all four rotors to effect control about each of the four axis independently. Preferably, YC thrust rotors 160 and 161 rotate in the same direction of rotation, and YC thrust rotors 162 and 163 rotate in the opposite direction of rotation relative to the direction of rotation of YC thrust rotors 160 and 161 for providing differential torque and yawing moments between the respective pairs of the thrust rotors. Due to the lateral tilts of the yaw controlling YC rotors 160-163, yaw control provided by the differential torque is augmented by the lateral thrust components of the YC thrust rotors 160-163 providing responsive and nimble yaw control authority. Forward thrust rotor 85 is powered by internal combustion engine 170 to provide maximize endurance during forward flight of aircraft 150, which is operated through the ANP, such as by a remote pilot or operator, or autonomously. In an alternate UAV configuration according to an alternate embodiment of the invention, forward thrust rotor 85 can be powered by an electric motor like VTOL thrust rotors 110-113 and YC thrust rotors 160-163. Aircraft 150 has four VTOL thrust rotors 110-113 and four YC thrust rotors 160-163 and is exemplary of an eight rotor system.

When performing VTOL maneuvers, VTOL thrust rotors 110-113 are activated for rotation to provide vertical lift through the activation of the corresponding VTOL electric motors 120, and YC thrust rotors 160-163 are activated for rotation to provide vertical lift through the activation of the corresponding YC electric motors. In forward flight, forward thrust rotor 85 is activated for rotation to provide forward thrust through the activation of internal combustion engine 170. The thrust of VTOL thrust rotors 110-113 can be increased and decreased to provide vertical lift, pitch, and roll. The thrust of YC thrust rotors 160-163 can be increased and decreased to provide vertical lift, pitch, roll, and yaw control authority. Further, the thrust of left front YC thrust rotor 160 can be increased and decreased to produce front yaw control authority on left side 61C of fuselage 61 proximate to leading extremity 61A of fuselage 61 of aircraft 150, the thrust of left rear YC thrust rotor 161 can be increased and decreased to produce a rear yaw control authority on left side 61C of fuselage 61 proximate to trailing extremity 61B of fuselage 61 of aircraft 150, the thrust of right front YC thrust rotor 162 can be increased and decreased to produce a front yaw control authority on right side 61D of fuselage 61 proximate to leading extremity 61A of fuselage 61 of aircraft 150, and the thrust of right rear YC thrust rotor 163 can be increased and decreased to produce a rear yaw control authority on right side 61D of fuselage 61 proximate to trailing extremity 61B of fuselage 61 of aircraft 150. In VTOL maneuvering of aircraft 150 with the activation of VTOL thrust rotors 110-113, forward thrust rotor 85 is activated to provide forward thrust so as to compensate for wind, and to provide forward acceleration to a predetermined fixed-wing flight speed, at which point VTOL thrust rotors 110-113 remain activated to provide lift to assist with vertical lift and to provide selected yaw control authority to aircraft 150. When yaw control authority is needed, YC thrust rotors 160-163 are selectively activated, or their thrusts selectively increased and decreased. YC thrust rotors 160-163 can be activated concurrently with VTOL thrust rotors 160-163 and used in concert with VTOL thrust rotors 110-113 to provide not only vertical lift but also yaw control authority.

UAVs or drones, such as aircraft 150, typically fall into one of a number of specific functional categories, including target and decoy for providing ground and aerial gunnery a target that simulates an enemy aircraft or missile, reconnaissance for providing battlefield intelligence, combat for providing attack capability for high-risk missions, logistics for providing cargo and logistics operations, research and development for developing UAV technologies, and civil and commercial applications. Multi-role airframe platforms are also prevalent in many UAV systems. In the present embodiment, aircraft 150 is configured as a reconnaissance UAV, and is furnished with an onboard and conventional camera payload 172 commonly found in known reconnaissance UAV platforms. In the present embodiment, camera payload 172 in FIGS. 5, 6, 8, and 9 is supported by fuselage 61, and is used to take and collect still and/or video imagery for reconnaissance purposes. Camera payload 172 is mounted in leading extremity 61A of fuselage 61, and can be mounted elsewhere along fuselage 61 as may be desired. Aircraft 150 can be configured with any form of reconnaissance systems for taking and collecting any desired form of reconnaissance data.

§ III. VTOL Aircraft with VTOL Thrust Rotors and Yaw Control Thrust Rotor

Referring now in relevant part to FIGS. 11, 12, 13, and 15, illustrated is another embodiment of a VTOL aircraft 180 including an airframe 190 including fuselage 191, fixed left and right wings 192 and 193, tail assembly or empennage 195, left and right head boom supports 200 and 201. Left and right wings 192 and 193 are fixed to fuselage 191, and so airframe 190 is exemplary of a fixed wing airframe in accordance with the invention. Fuselage 191 has front or leading end/extremity 191A and an opposed rear or trailing end/extremity 191B, and opposed left and right sides 191C and 191D extending from front or leading extremity 191A to trailing extremity 191B. Trailing extremity 191B carries empennage 195 at the rear of aircraft 180, which includes fin 196 and tailplane 197 in this example. Empennage 190 at trailing extremity 191B is the rear part of airframe 190 of aircraft 180, gives stability to aircraft 180. Left wing 192 and right wing 193 are applied to fuselage 191 and are airfoils that produce lift for flight of aircraft 180 through the atmosphere. Left wing 191 has a left leading edge 192A and an opposed left trailing edge 192B, and a left top surface 192C and an opposed left bottom surface 192D that extend between left leading and trailing edges 192A and 192B. Right wing 193 has a right leading edge 193A and an opposed right trailing edge 193B, and a right top surface 193C and an opposed right bottom surface 193D that extend between right leading and trailing edges 193A and 193B. Outwardly pitched stabilizer fins 192E and 193E depend downwardly from the bottom surfaces 192D and 193E of the respective left and right wings 192 and 193 to promote forward flight stability. Left and right wings 192 and 193 are the mirror image of one another, and left wing 192 has a thickness or wing thickness extending from top surface 192C to bottom surface 192D, and right wing 193 has a thickness or wing thickness extending from top surface 193C to bottom surface 193D. The wing thickness of left wing 192 is the same as the wing thickness of right wing 193. During flight, a region of lower-than-normal air pressure is generated over top surfaces 192C and 193C of left and right wings 192 and 193, with a higher pressure existing on bottom surfaces 192D and 193D of left and right wings 192 and 193. The lower air pressure on top surfaces 192C and 193C of left and right wings 192 and 193 generates a smaller downward force on the top surfaces 192C and 193C of left and right wings 192 and 193 than the upward force generated by the higher air pressure on the bottom surfaces 192D and 193D of left and right wings 192 and 193. Hence, a net upward force acts on the left and right wings 192 and 193 to generate lift by the left and right wings 192 and 193. Left wing 192 is applied to and extends from left side 191C of fuselage 191 proximate to trailing extremity 191B and right wing 193 is applied to and extends from right side 191D of fuselage 191 proximate to trailing extremity 191B. A left aileron can be retained pivotally on a rear of left wing 192 near trailing edge 192B of left wing 192 near the outer or distal extremity of left wing 192, and a right aileron can be retained pivotally on a rear of right wing 193 near trailing edge 193B of right wing 193 near the outer or distal extremity of right wing 193. Forward thrust rotor 205 is mounted to front extremity 191B of fuselage 191 and is capable of providing forward thrust to aircraft 180.

Left head boom support 200 is coupled to left wing 192, and right head boom support 201 is coupled to right wing 193. Left head boom support 200 extends forward from left wing 192 and leading edge 192A of left wing 192, and right head boom support 201 extends forward from right wing 193 and leading edge 193A of right wing 193 to an outer end 101 in FIG. 3. Left head boom support 200 and right head boom support 201 parallel with respect to each other, and are identical being coextensive and equal in size and shape. Left head boom support 200 is located along left side 191C of fuselage 191, and is spaced-apart from, or is otherwise located outboard of, left side 191C of fuselage 191 and is parallel with respect to fuselage 191. Right head boom support 201 is located along right side 191D of fuselage 191, and is spaced-apart from, or is otherwise located outboard of, right side 191D of fuselage 191 and is parallel with respect to fuselage 191.

Aircraft 180 is formed with a VTOL propulsion system, or simply a VTOL system, which is a triple or trirotor VTOL system including a left front VTOL thrust rotor 210, a right front VTOL thrust rotor 211, and a rear VTOL thrust rotor 212, all of which are mounted to, and carried by, airframe 190, and which are capable of providing vertical lift to aircraft 180 and yaw control authority. VTOL thrust rotors 110-113 are open VTOL thrust rotors and are mounted to airframe 190 of aircraft 180 in a trirotor pattern for providing vertical lift and yaw control authority to aircraft 180 as will be explained in detail below. VTOL thrust rotors 210-212 are identical and coextensive being equal in size and shape and are capable of providing vertical lift and yaw control authority to aircraft 180 so as to be useful by aircraft 180 in performing VTOL maneuvers. Left front VTOL thrust rotor 210 is located outboard of left side 191C of fuselage 191 between leading extremity 191A of fuselage 191 and leading edge 192A of left wing 192, right front VTOL thrust rotor 211 is located outboard of right side 191D of fuselage 191 between leading extremity 191A of fuselage 191 and leading edge 193A of right wing 193, and rear VTOL thrust rotor 212 is positioned between left and right front VTOL thrust rotors 210 and 211 and is mounted atop fuselage 191 between left and right wings 192 and 193 and empennage 195 at trailing extremity 191B of fuselage 191 of airframe 190.

Left front VTOL thrust rotor 210 is mounted to and atop left head boom support 200 of airframe 190 along the left side 191C of fuselage 191 and is positioned forwardly of leading edge 192A of left wing 192 outboard of left side 191C of fuselage 191 near leading extremity 191A of fuselage 191 and is positioned near left side 191C of fuselage 191 between left side 191C of fuselage 191 and the outer or distal extremity of left wing 192. Right front VTOL thrust rotor 211 is mounted to and atop right head boom support 201 of airframe 190 along the right side 191D of fuselage 191 and is positioned forwardly of leading edge 193A of right wing 193 outboard of right side 191D of fuselage 191 near leading extremity 191A of fuselage 191 and is positioned near right side 191D of fuselage 191 between right side 191D of fuselage 191 and the outer or distal extremity of right wing 193. Left front VTOL thrust rotor 210 is forward of leading edge 192A of left wing 192 and is mounted to and atop left head boom support 200, and right front VTOL thrust rotor 211 is forward of leading edge 193A of right wing 193 and is mounted to and atop right head boom support 201. Left front VTOL thrust rotor 210 and right front VTOL thrust rotor 211 are equidistant from, or otherwise with respect to, left and right wings 192 and 193, respectively, and fuselage 191. Left front VTOL thrust rotor 210 diametrically opposes right front VTOL thrust rotor 211 proximate to leading extremity 191A of fuselage 191. Rear VTOL thrust rotor 212 mounted atop fuselage 191 is equidistant with respect to left and right front VTOL thrust rotors 210 and 211 in FIGS. 13 and 15, and is centered along the longitudinal axis of aircraft 180.

Figure 11:
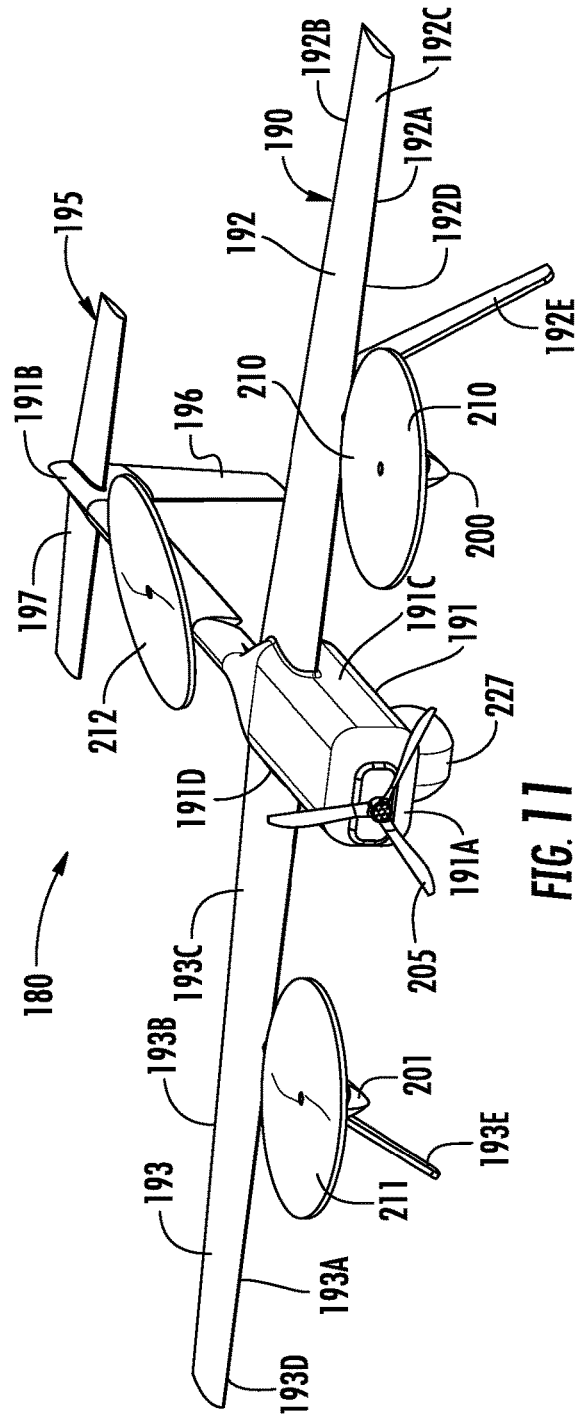
FIG. 11 is a top perspective view of yet another embodiment of a vertical take-off and landing aircraft constructed and arranged in accordance with the principle of the invention, the vertical take-off and landing aircraft including an aft rotor tilted to one side of the aircraft.
Figure 12:
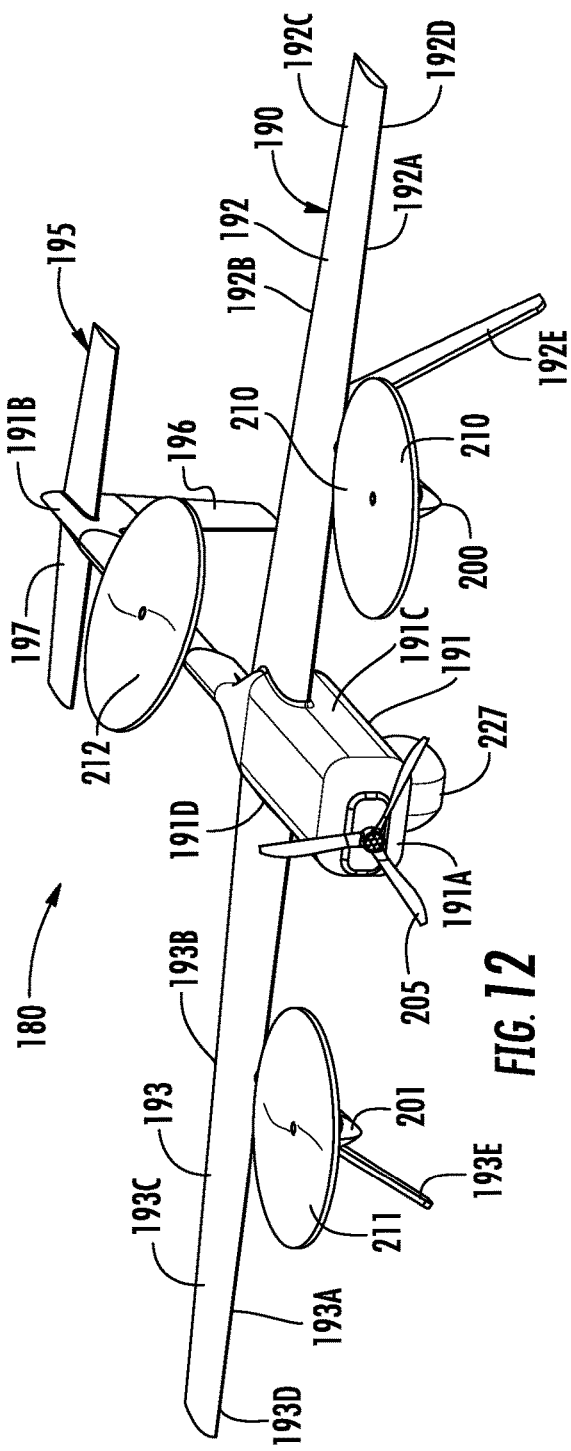
FIG. 12 is a view similar to that of FIG. 11 illustrating the aft rotor as it would appear tilted to an opposite side of the aircraft.
Figure 13:
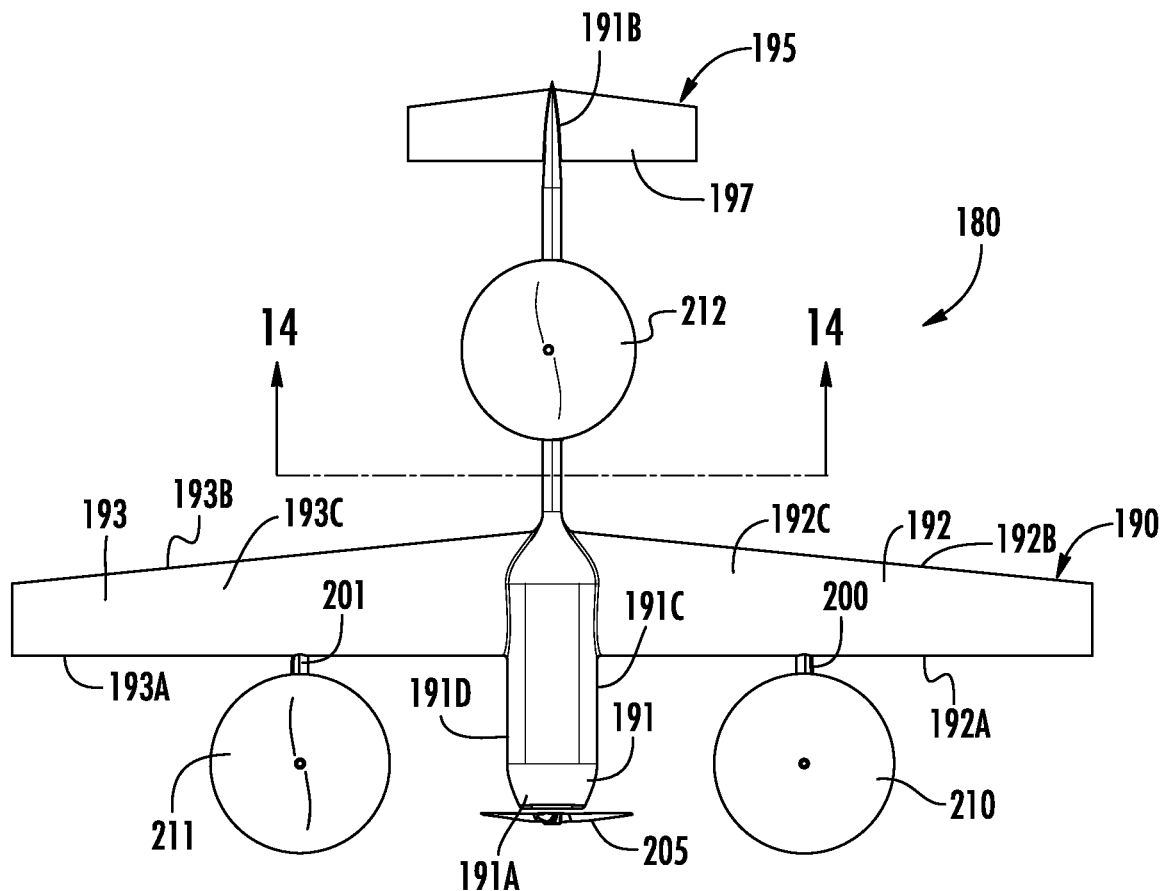
FIG. 13 is a top plan view of the embodiment of FIG. 11.
Figure 14:
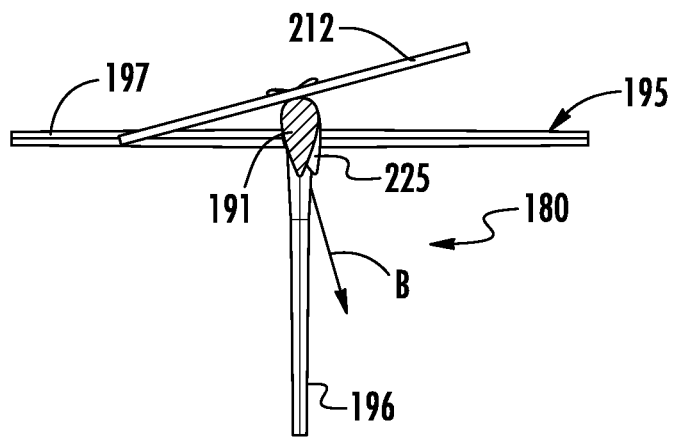
FIG. 14 is a section view taken along line 14-14 of FIG. 13.
Figure 15:
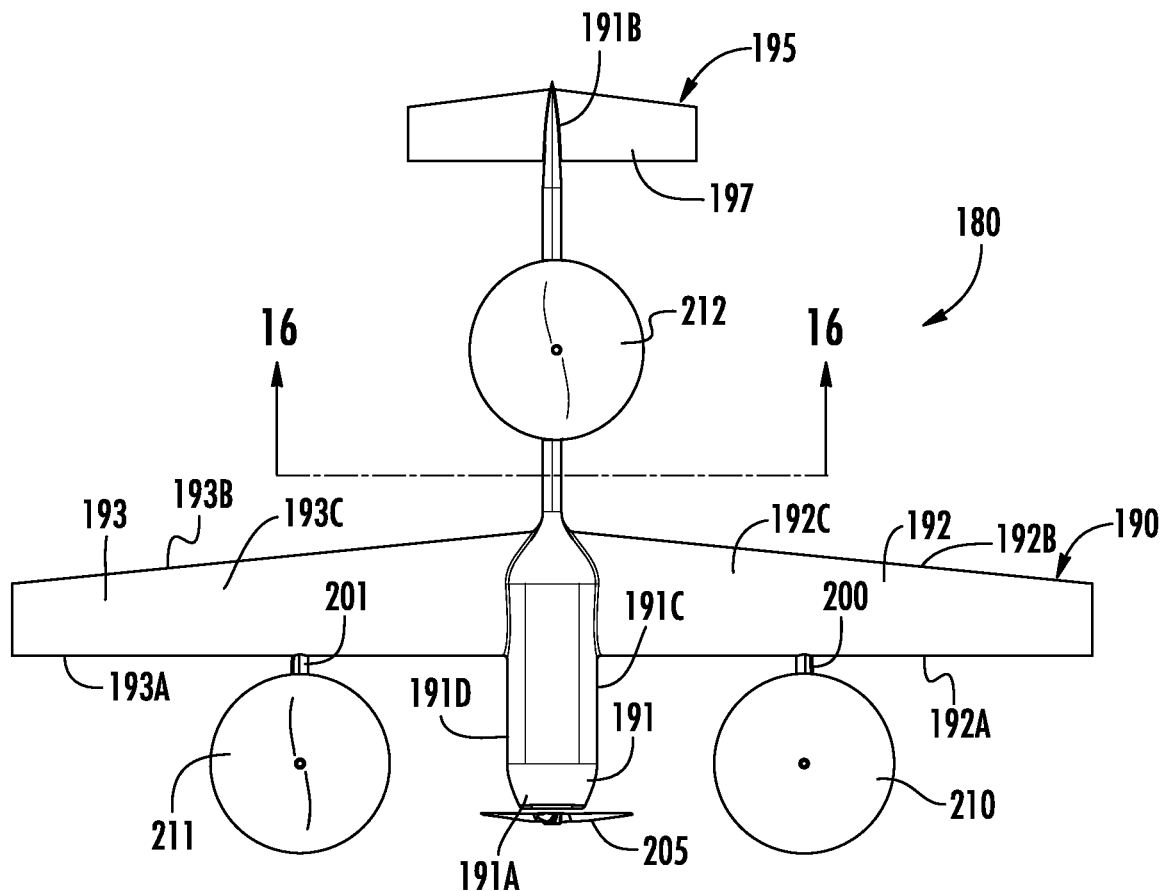
FIG. 15 is a top plan view of the embodiment of FIG. 12.
Figure 16:
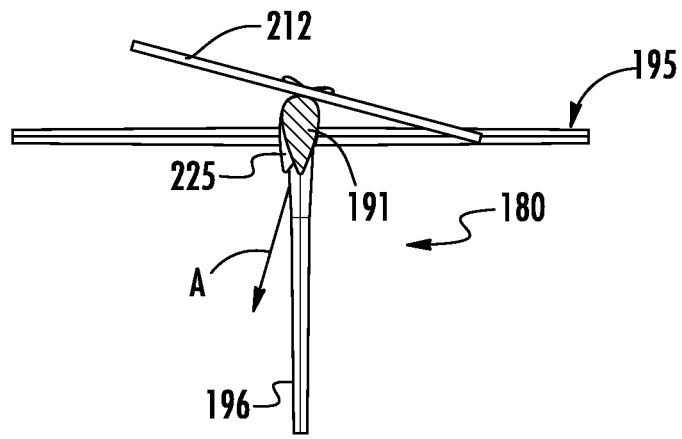
FIG. 16 is a section view taken along line 16-16 of FIG. 15.
Figure 17:
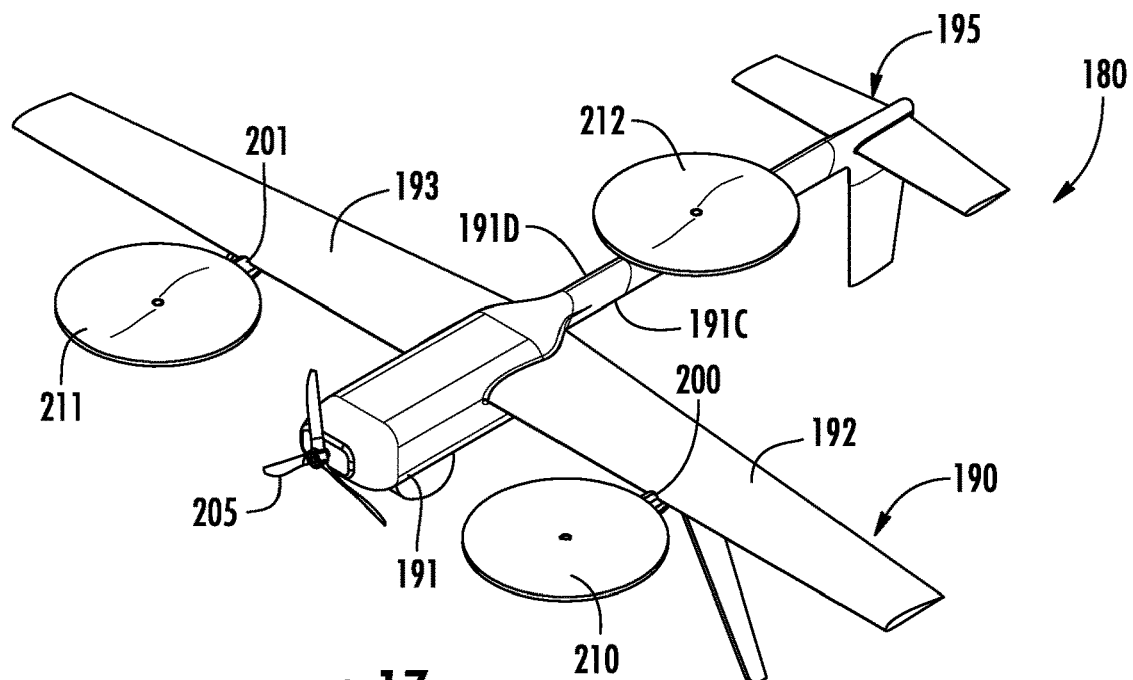
FIG. 17 is a perspective view of the embodiment of FIG. 11 illustrating the aft rotor in a horizontal position relative the tilted positions of FIG. 11 and FIG. 12.
Figure 18:
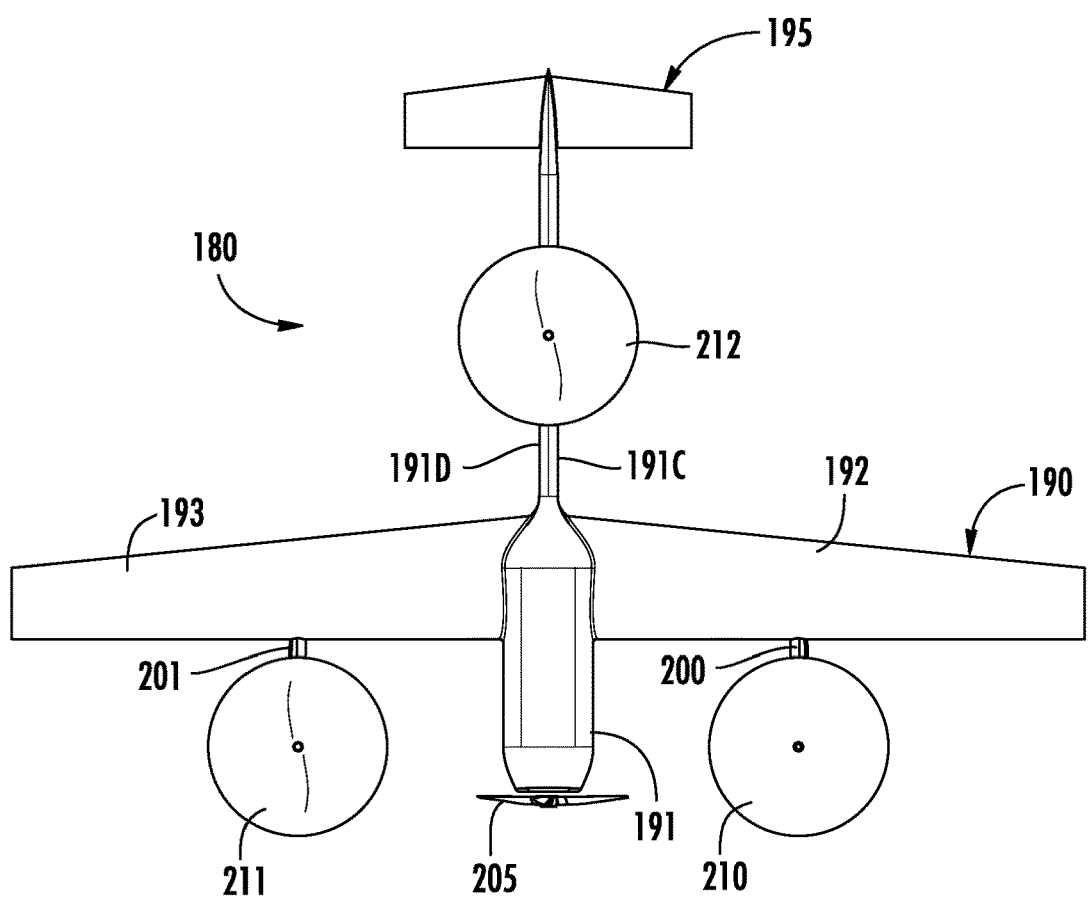
FIG. 18 is a top plan view of the embodiment of FIG. 17.
Figure 19:
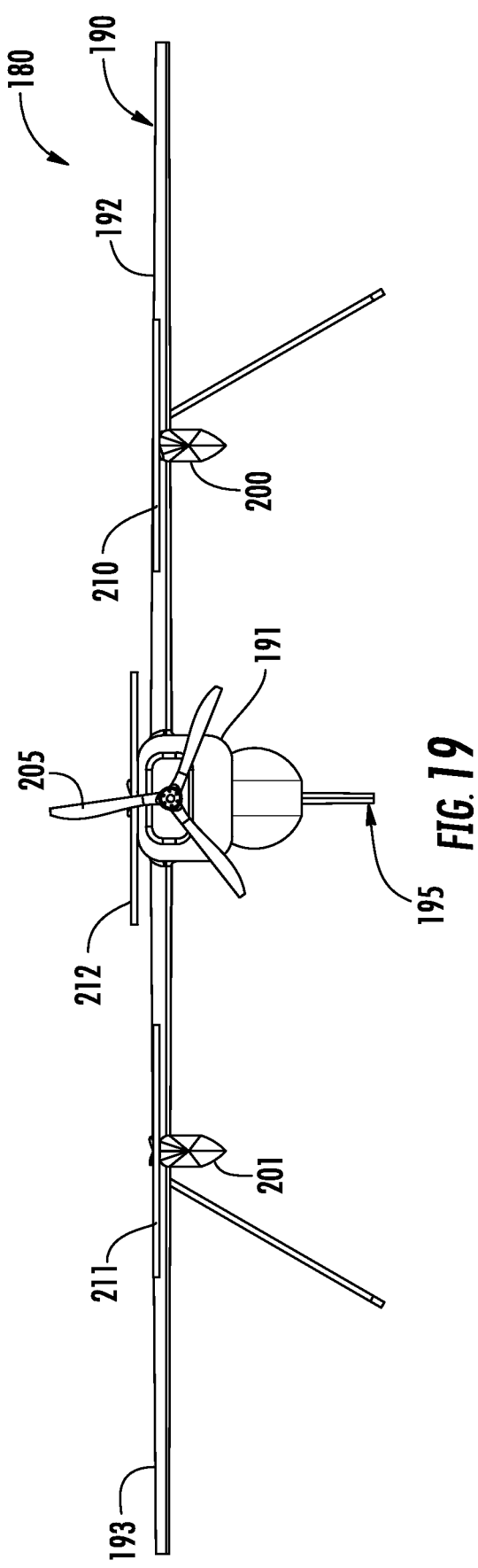
FIG. 19 is a front elevation view of the embodiment of FIG. 17.
Figure 20:
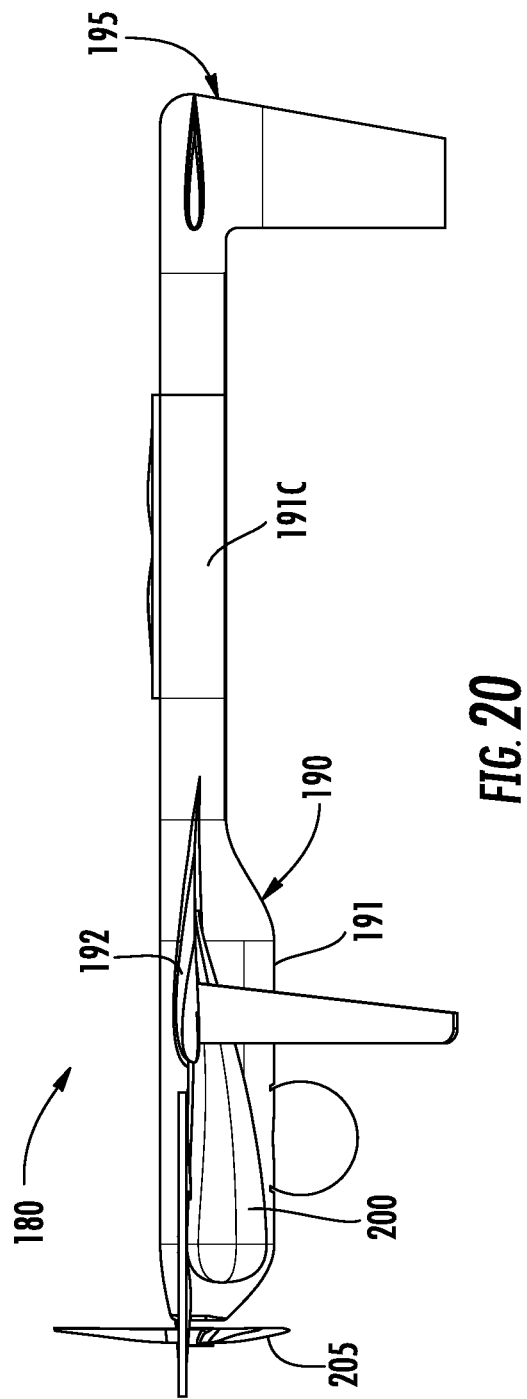
FIG. 20 is a left side elevation view of the embodiment of FIG. 17.
Figure 21:
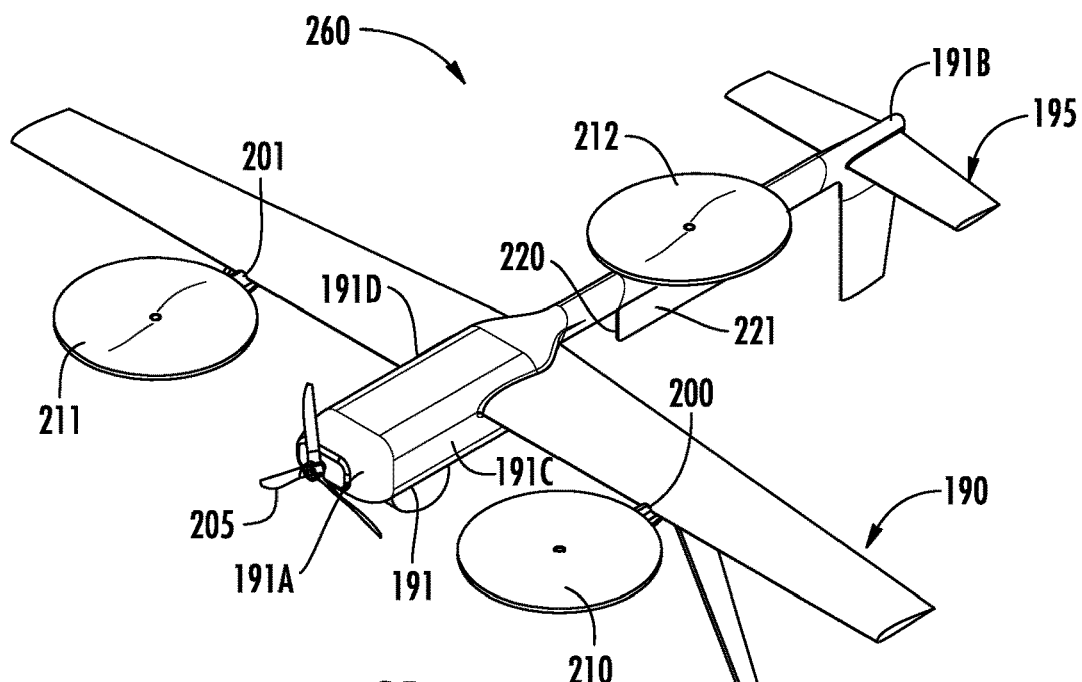
FIG. 21 is a top perspective view of yet still another embodiment of a vertical take-off and landing aircraft constructed and arranged in accordance with the principle of the invention, the vertical take-off and landing aircraft including an aft rotor positioned over an aft fin.
Figure 22:
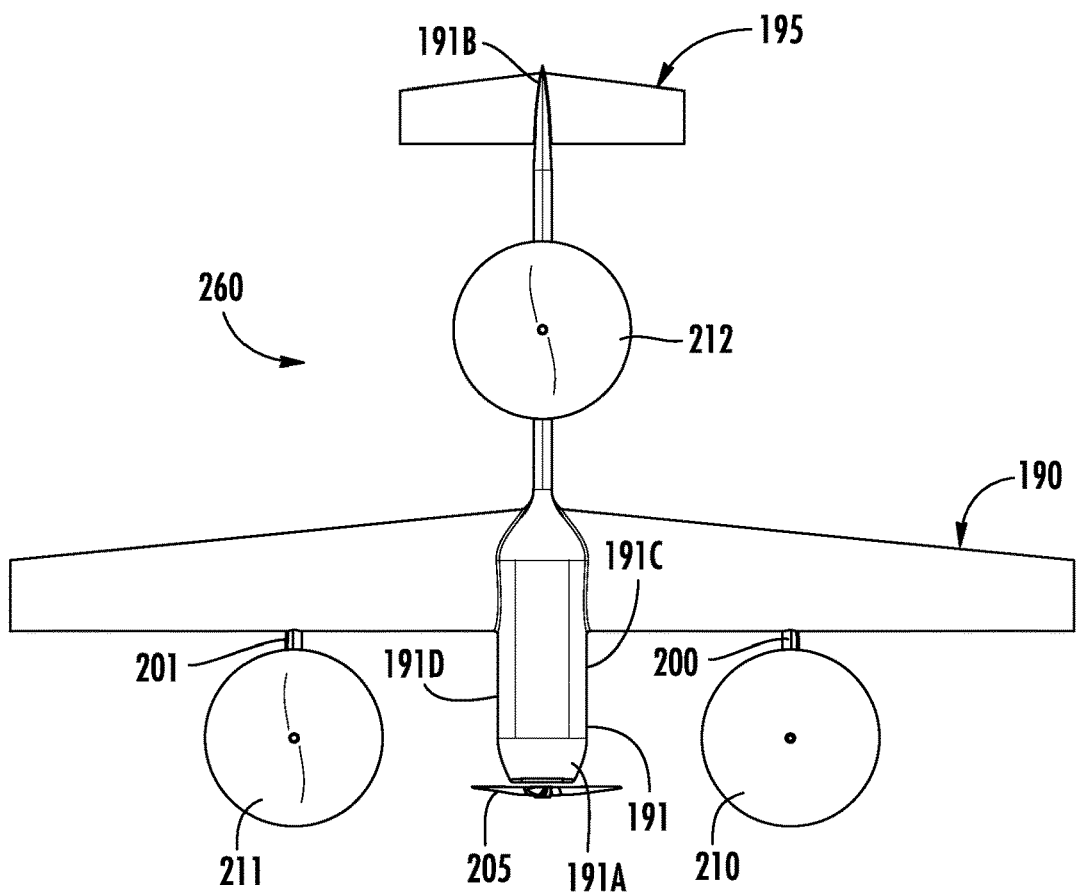
FIG. 22 is a top plan view of the embodiment of FIG. 21.
Figure 23:
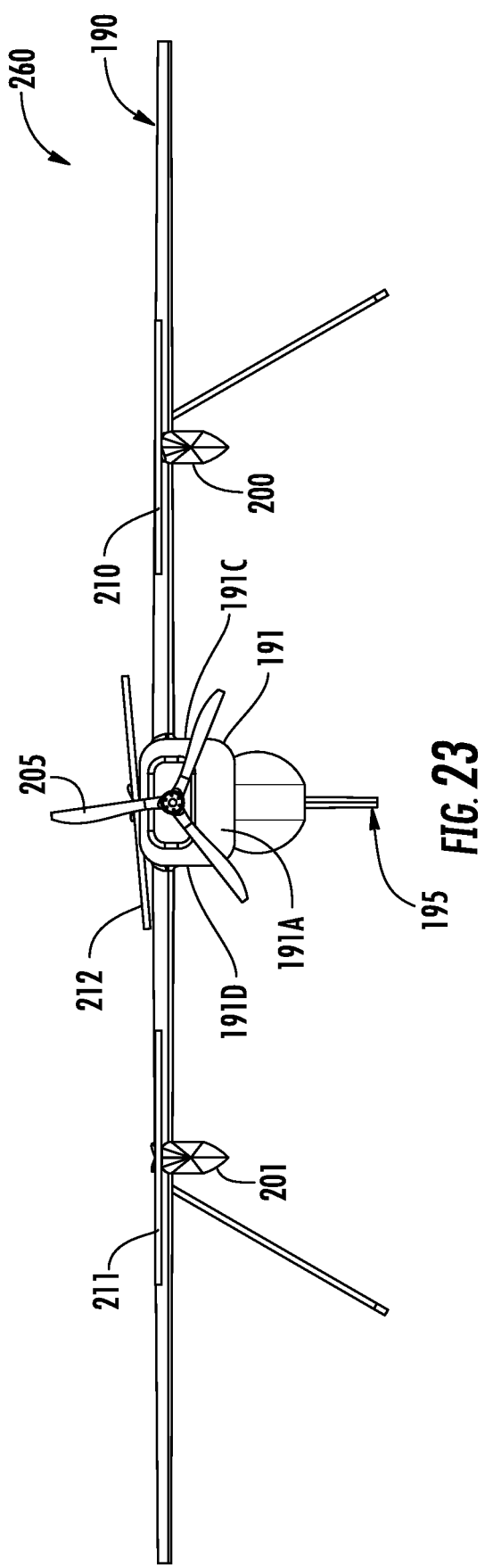
FIG. 23 is a front elevation view of the embodiment of FIG. 21.
Figure 24:
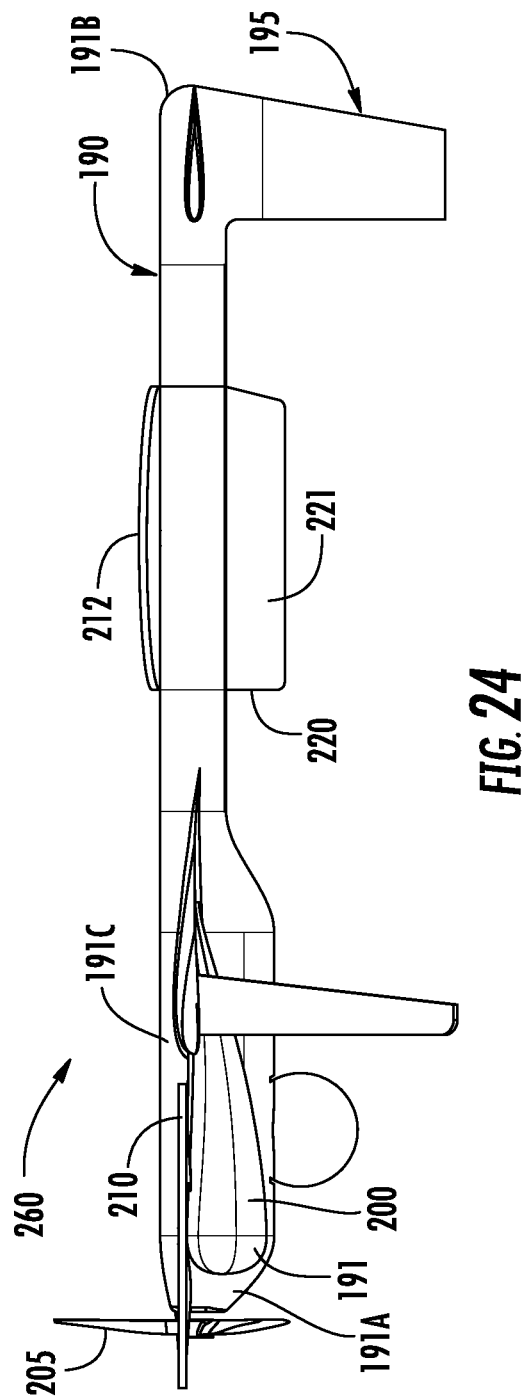
FIG. 24 is a left side elevation view of the embodiment of FIG. 21.
Figure 25:
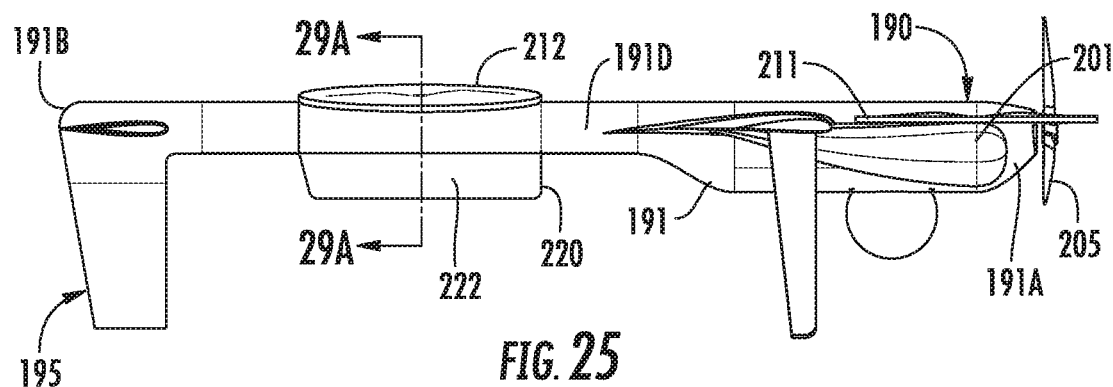
FIG. 25 is a left side elevation view of the embodiment of FIG. 21.
Figure 26:
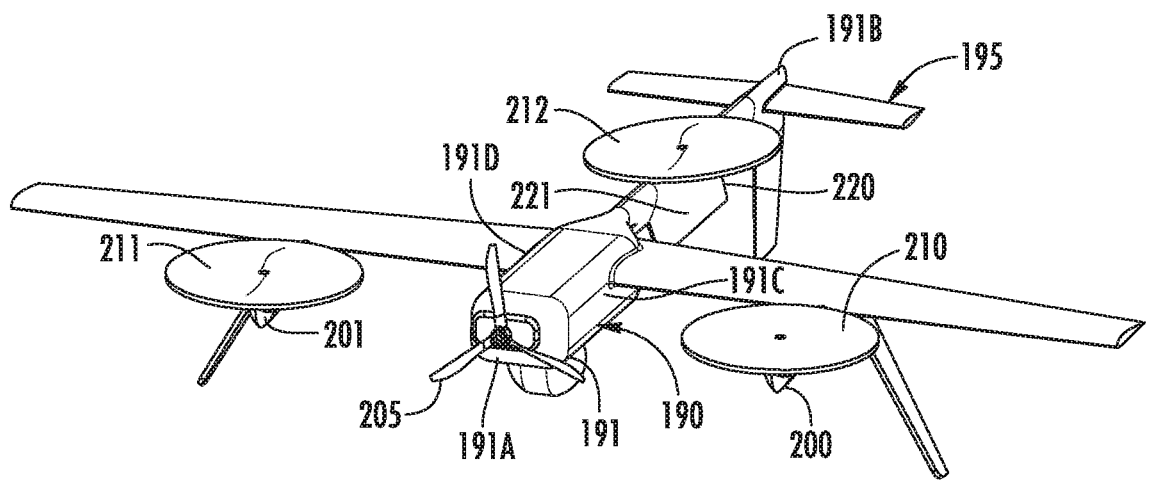
FIG. 26 is view similar to that of FIG. 21 illustrating the aft fin tilted left.
Figure 27:
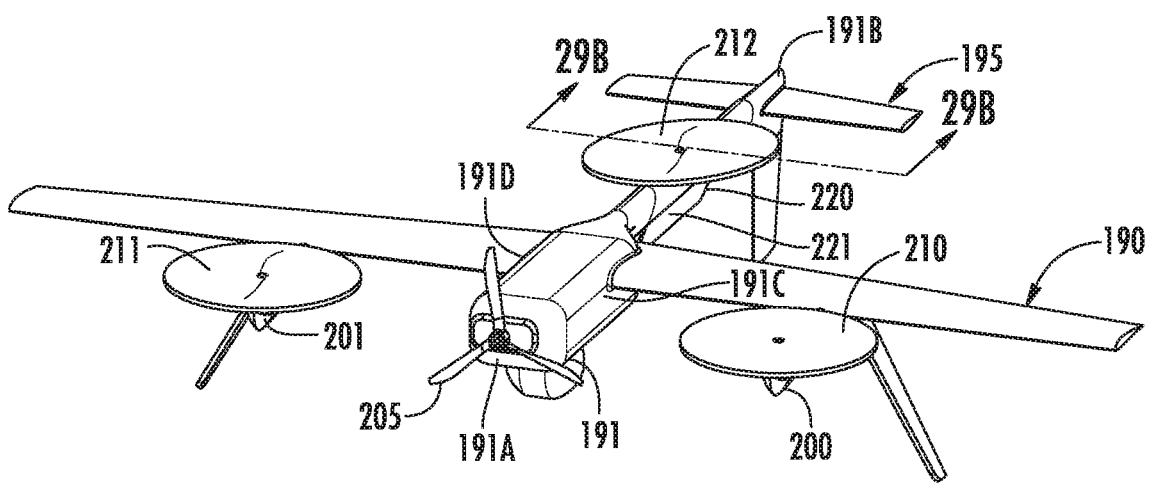
FIG. 27 is a view like that of FIG. 26 illustrating the aft fin tilted right.

Rear VTOL thrust rotor 212 is mounted atop fuselage 191 for movement from a first position in FIGS. 12 and 16 laterally tilted from horizontal outwardly to the left relative to fuselage 191 to direct its thrust downwardly under fuselage to the right for providing right yaw control authority, and a second position in FIGS. 11 and 14 laterally tilted from horizontal outwardly to the right relative to fuselage 191 to direct its thrust downwardly under fuselage to the left for providing left yaw control authority. Rear VTOL thrust rotor 220 is mounted to pivoting engine pod 225 which is actuated to laterally pivot rear VTOL thrust rotor 220 from its left laterally tilted positon in FIGS. 12 and 16, and its right laterally tilted position in FIGS. 11 and 14, and also to a horizontal position relative to the left and right laterally tilted positions in FIGS. 17-20. Pivoting engine pod 225 is conventional and is conventionally operated to laterally pivot rear VTOL thrust rotor 220 from its left laterally tilted positon in FIGS. 12 and 16, and its right laterally tilted position in FIGS. 11 and 14. Rear VTOL thrust rotor 212 does not tilt forwardly or rearwardly, but rather laterally from horizontal to the left and to the right as described without providing forward or rearward thrust. Selective yaw control is affected by selectively adjusting rear VTOL thrust rotor 220 between the left and right laterally tilted positions.

In its left laterally tilted position in FIG. 16, rear VTOL thrust rotor 212 is laterally tilted from horizontal outwardly to the left side 191C of fuselage 191 for providing vertical lift, and right yaw motion or control authority to aircraft 180 along left side 191C of fuselage 191 of aircraft 180. In its right laterally tilted position in FIG. 14, rear VTOL thrust rotor 212 is laterally tilted from horizontal outwardly to the right side 191C of fuselage 191 for providing vertical lift, and left yaw motion or control authority to aircraft 180 along right side 191D of fuselage 191 of aircraft 180. In this embodiment, in its left laterally tilted position in FIG. 16 rear VTOL thrust rotor 212 is laterally tilted fifteen degrees from horizontal outwardly to the left to direct its thrust downwardly under fuselage 61 to the left from the left side of aircraft 180 to the right side of aircraft 180 in the direction of arrowed line A at an angle of fifteen degrees for right yaw motion. In its right laterally tilted position in FIG. 16 rear VTOL thrust rotor 212 is laterally tilted fifteen degrees from horizontal outwardly to the right to direct its thrust downwardly under fuselage 61 to the right from the left side of aircraft 180 to the right side of aircraft 180 in the direction of arrowed line B at an angle of fifteen degrees for left yaw motion. And so in the left laterally tilted position of rear VTOL thrust rotor 212 in FIG. 16 rear VTOL thrust rotor 212 provides vertical lift and angled yaw authority thrust vectoring for right yaw motion, and in the right laterally tilted position of rear VTOL thrust rotor 212 in FIG. 14 rear VTOL thrust rotor 212 provides vertical lift and angled yaw authority thrust vectoring for left yaw motion.

In an alternate embodiment, in its left laterally tilted position rear VTOL thrust rotor 212 can be laterally tilted less or more than fifteen degrees from horizontal, and in its right laterally tilted position rear VTOL thrust rotor 212 can be laterally tilted less or more than fifteen degrees from horizontal, all for providing vertical lift and left and right yaw control authority.

During flight of aircraft 180, rear VTOL thrust rotor 212, which operates as a hybrid VTOL YC thrust rotor, can be laterally tilted to the left toward left side 191C of fuselage 191 of aircraft 180 in FIG. 16 for providing left yaw control authority to aircraft 180, and can be laterally tilted to the right toward right side 191D of fuselage 191 of aircraft 180 in FIG. 14. The thrust of rear VTOL thrust rotor 212 can be increased and decreased to increase and decrease vertical lift and to increase and decrease left and right yaw control authority.

In this embodiment, left and right VTOL thrust rotors 210 and 211 are each horizontal for providing vertical lift to aircraft 180 for VTOL maneuvering of aircraft 180 without providing forward or rearward thrust. Rear VTOL thrust rotor 212 is a translating rotor in that it pivots laterally between its left and right laterally tilted positions. VTOL thrust rotors 210-212 are each completely exposed and not surrounded and housed within thruster housings or casings. As such, VTOL thrust rotors 210-212 are "open" thrust rotors being free of thruster housings or casings, which prevents buffeting from occurring in response to the activation of VTOL thrust rotors 210-212 during operation, e.g., VTOL maneuvering.

VTOL thrust rotors 210-212 are each driven for rotation by an electric motor. The electric motor that drives left front VTOL thrust rotor 210 is housed in left head boom support 200, the electric motor that drives right front VTOL thrust rotor 211 is housed in right head boom support 201, and the electric motor that drives rear VTOL thrust rotor 212 is housed in engine pod 225. The electric motors receive electrical power from a battery pack onboard fuselage 191. The electric motors are electrically coupled to the battery pack housed in fuselage 191 with conventional, onboard electrical wiring. The battery pack is formed with batteries, super capacitors or other like or similar battery-like technology as is customary in the art. The battery pack that powers electric motors 120 is customarily rechargeable, and can be recharged by a generator. An internal combustion engine drives forward thrust rotor 205. The internal combustion engine is fueled by fuel housed in one or more fuel tanks onboard fuselage 191. The internal combustion engine is coupled in fuel communication with the one or more fuel tanks with one or more conventional, onboard fuel lines as is customary in the art. In an alternate embodiment, forward thrust rotor 205 can be driven by an electric motor housed in fuselage 191 powered by the battery pack. Aircraft 180 can be configured with a generator for recharging the battery pack.

Aircraft 180 is an unmanned aerial vehicle (UAV) or drone, and is furnished with an onboard UAV or drone autopilot ANP housed in fuselage 191. The ANP is operated by remote control of a navigator or pilot for remotely controlling the operation of aircraft 180, including the electric motors for activating and deactivating VTOL thrust rotors 210-212 and for increasing and decreasing the thrust of VTOL thrust rotors 210-212 for pitch and roll, for increasing and decreasing the thrust of rear VTOL thrust rotor 212 and laterally tilting rear VTOL thrust rotor to the left and to the right for left and right yaw control authority, for activating and deactivating the internal combustion engine for activating and deactivating forward thrust rotor 205, and other onboard aircraft 180 systems. Alternatively, the ANP can be an autonomous system, a self-directing system to provide autonomous control of the operation of aircraft 180. The ANP receives electrical power from the onboard aircraft 180 battery pack, and the ANP is electrically coupled to the onboard aircraft 180 battery pack with conventional, onboard electrical wiring. Again, the ANP can have a combined partially manual and partially autonomous mode. In this mode, the manual pilot provides angle commands while the autopilot provides low-level stability and control, including yaw controlling.

VTOL thrust rotors 210-213 provide for vertical take-off and lift, and pitch and roll adjustments, rear VTOL thrust rotor 2130 provides left and right yaw control authority, and forward thrust rotor 205 provides for forward thrust during flight. VTOL thrust rotors 210-212 are powered by the electric motors, which, in turn, are electrically powered by the vehicle onboard battery pack, which together form an electric powered VTOL system in aircraft 180, which is operated through the ANP, such as by a remote pilot or operator, or autonomously. To provide four axis of control (roll, pitch, yaw, and vertical thrust), VTOL thrust rotors 210-213 are controlled by a mixture of control inputs to all thee rotors to effect control about each of the four axis independently. Preferably, left VTOL thrust rotor 210 rotates in one direction, right VTOL thrust rotor 211 rotates in the opposite direction, and rear VTOL thrust rotor 212 can rotate in the direction of left front VTOL thrust rotor 210 or right front VTOL thrust rotor 211. Forward thrust rotor 205 is powered by the internal combustion engine to provide maximize endurance during forward flight of aircraft 180, which is operated through the ANP, such as by a remote pilot or operator, or autonomously. Again, in an alternate UAV configuration according to an alternate embodiment of the invention, forward thrust rotor 205 can be powered by an electric motor like VTOL thrust rotors 210-212. Aircraft 180 has three VTOL thrust rotors 210-212 and is exemplary of a trirotor system as described herein.

When performing VTOL maneuvers, VTOL thrust rotors 210-212 are activated for rotation to provide vertical lift through the activation of corresponding electric motors. In forward flight, forward thrust rotor 205 is activated for rotation to provide forward thrust through the activation of internal combustion engine. The thrust of VTOL thrust rotors 210-212 can be increased and decreased to provide vertical lift, pitch, roll, and yaw. The thrust of left front VTOL thrust rotor 210 can be increased and decreased to affect vertical lift, pitch, and roll on left side 191C of fuselage 191 proximate to leading extremity 191A of fuselage 191 of aircraft 180, the thrust of right front VTOL thrust rotor 211 can be increased and decreased to affect vertical lift, pitch, and roll on right side 191D of fuselage 191 proximate to leading extremity 191A of fuselage 191 of aircraft 180, rear VTOL thrust rotor 212 can be laterally tilted to the right and to the left for affecting yaw control authority on left and right sides 191C and 191D of aircraft 180, and the thrust of rear VTOL thrust rotor 212 can be increased and decreased for further affecting yaw control authority from either side of aircraft 180. Rear VTOL thrust rotor 212 can be set to any position between its left laterally tilted position and its right laterally tilted position for selecting affecting yaw control authority in conjunction with increasing and decreasing the thrust of rear VTOL thrust rotor 212. In VTOL maneuvering of aircraft 180, forward thrust rotor 205 is activated to provide forward thrust so as to compensate for wind, and to provide forward acceleration to a predetermined fixed-wing flight speed, at which point VTOL thrust rotors 210-212 can remain activated to provide lift to assist with vertical lift and to provide selected yaw control authority to aircraft 180.

In FIGS. 11 and 12, aircraft 180 is configured as a reconnaissance UAV, and is furnished with an onboard and conventional camera payload 227 commonly found in known reconnaissance UAV platforms. Camera payload 227 is supported by fuselage 191, and is used to take and collect still and/or video imagery for reconnaissance purposes. Camera payload 227 is mounted in leading extremity 191A of fuselage 191, and can be mounted elsewhere along fuselage 191 as may be desired. Aircraft 180 can be configured with any form of reconnaissance systems for taking and collecting any desired form of reconnaissance data.

IV. VTOL Aircraft with VTOL Thrust Rotors and Yaw Control Fin

Reference is now made in relevant part to FIGS. 21-29, in which there is illustrated yet still a further embodiment of a VTOL aircraft 260. In common with aircraft 180, aircraft 260 shares airframe 190 including fuselage 191 having leading extremity 191A, trailing extremity 191B, left side 191C, and right side 191D, wings 192 and 193, empennage 195, left and right boom supports 200 and 201, forward thrust rotor 205, left VTOL thrust rotor 210, right VTOL thrust rotor 211, and rear VTOL thrust rotor 212 mounted atop fuselage 191. In this embodiment, rear VTOL thrust rotor 212 is mounted atop fuselage 191 over an aft fin 220, having control surfaces 221 and 222, that extends downwardly from fuselage 191 between empennage 195 and left and right wings 192 and 193.

Aft fin or fin 220 extends downwardly from fuselage 191 between empennage 195 carried by trailing extremity 191B, and left and right wings 192 and 193. Fin 220 is fixed to fuselage 191, depends downward from fuselage 191, and includes control surface 221 facing outwardly from left side 191C of fuselage 191, and control surface 222 facing outwardly from right side 191D of fuselage 191.

Figure 28:
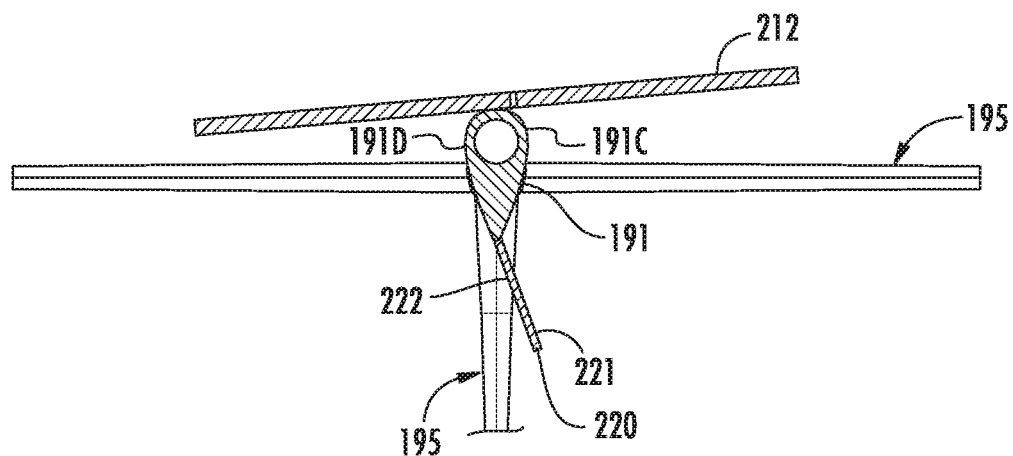
FIG. 28 is a section view taken along lie 29A-29A of FIG. 25.
Figure 29:
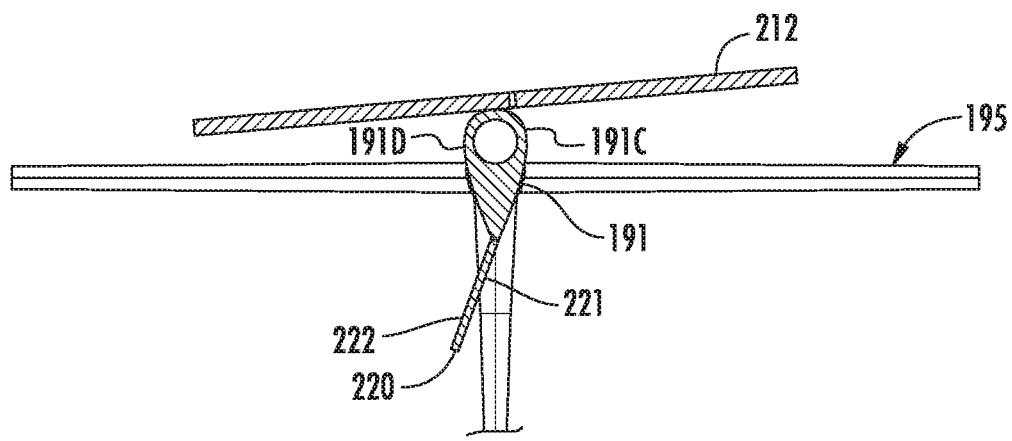
FIG. 29 is a section view taken along lie 29B-29B of FIG. 27.

Rear VTOL thrust rotor 212 of aircraft 260 is laterally tilted from horizontal outwardly to the right relative to fuselage 191 to direct its thrust downwardly under fuselage to the left inwardly toward right side 191D of fuselage 191 and outwardly away from left side 191C of fuselage 191. FIGS. 28 and 29 show this lateral tilt of rear VTOL thrust rotor 212. In this embodiment, rear VTOL thrust rotor 212 is laterally tilted four degrees from horizontal outwardly to the right side 191D of fuselage 191 to direct its thrust downwardly under fuselage 191 inwardly four degrees, i.e., angled thrust vectoring, from horizontal toward right side 191D of fuselage 191 and away from left side 191C of fuselage 191.

In FIGS. 21, and 24-29, fin 220 extends downwardly from fuselage 191 between empennage 195 carried by trailing extremity 191B, and left and right wings 192 and 193. Fin 220 is coupled to fuselage 191, extends downward from fuselage 191, and includes control surface 221 facing outwardly from left side 191C of fuselage 191, and control surface 222 facing outwardly from right side 191D of fuselage 191. Fin 220 is mounted to fuselage 191 under rear VTOL thrust rotor 212 for movement from a left yaw control positon in FIGS. 26 and 28 angled outwardly from left side 191C of fuselage 191 and a right yaw control position angled outwardly from right side 191D of fuselage 191 in FIGS. 27 and 29. In the left yaw control position of fin 220 in FIGS. 26 and 28, fin 220 and control surface 221 are angled outwardly from left side 191C of fuselage 191 twenty-three degrees from vertical upwardly toward the underside of rear VTOL thrust rotor 212, and the downward thrust from rear VTOL thrust rotor 212 is directed angularly downward against control surface 221, which deflects the thrust for providing left yaw motion or control authority to aircraft 260 along left side 191C of fuselage 191 of aircraft 260. In the right yaw control position of fin 220 in FIGS. 27 and 29, fin 220 and control surface 222 is angled outwardly from right side 191D of fuselage 191 twenty-three degrees from vertical upwardly toward the underside of rear VTOL thrust rotor 212, and thrust from rear VTOL thrust rotor 212 is directed angularly downwardly against control surface 222, which deflects the thrust for providing right yaw control authority to aircraft 260 along right side 191D of fuselage 191 of aircraft 260. And so rather than affecting left and right yaw control authority via movement of rear VTOL thrust rotor 212 from a left laterally tilted position relative to fuselage 191 in FIGS. 12 and 16 toward left side 191C of fuselage 191 for angled yaw authority thrust vectoring against control surface 221 of fin 220 to a right laterally tilted position relative to fuselage 191 in FIGS. 11 and 14 toward right side 191D of fuselage 191 for angled yaw authority thrust vectoring against control surface 222 of fin 220 as in aircraft 180, movement of fin 220 from its left yaw control position 220 in FIGS. 26 and 28 and its right yaw control position in FIGS. 27 and 29 relative to rear VTOL thrust rotor 212 set to its laterally tilt from horizontal affects left and right yaw control authority for aircraft 260.

As in aircraft 180, the thrust of rear VTOL thrust rotor can be increased and decreased for affecting not only lift but also left and right yaw control authority. Moreover, fin 220 can be set to any position between its left yaw control position and its right yaw control position for affecting yaw control authority. Fin 220 is mounted to fuselage 191 under rear VTOL thrust rotor 212 for movement from its left yaw control position to its right yaw control position with an actuator pivot assembly 265 in FIGS. 28 and 29, which mechanically pivotally translates fin 220 from its left and right yaw control positions. Actuator pivot assembly 265 is operated via the ANP onboard aircraft 260.

Although rear VTOL thrust rotor 212 is laterally tilted four degrees from horizontal outwardly to the right side 191D of fuselage 191 to direct its thrust downwardly under fuselage 191 inwardly four degrees from horizontal away from left side 191C of fuselage 191, rear VTOL thrust rotor 212 can be laterally tilted less or more than four degrees from horizontal as may be desired. Again, in the present embodiment rear VTOL thrust rotor 212 is laterally tilted from horizontal outwardly to the right side 191D of fuselage 191 to direct its thrust downwardly under fuselage 191 inwardly from horizontal toward right side 191D of fuselage 191 and away from left side 191C of fuselage 191. In alternate embodiments, rear VTOL thrust rotor 212 can be laterally tilted from horizontal outwardly to the left side 191C of fuselage 191 to direct its thrust downwardly under fuselage 191 inwardly from horizontal toward left side 191C of fuselage 191 and away from right side 191D of fuselage 191, rear VTOL thrust rotor 212 can be horizontal, or rear VTOL 212 can laterally tilt to the left and to the right as in aircraft 180.

V. VTOL Conversion Kit and Aircraft

Figure 30:
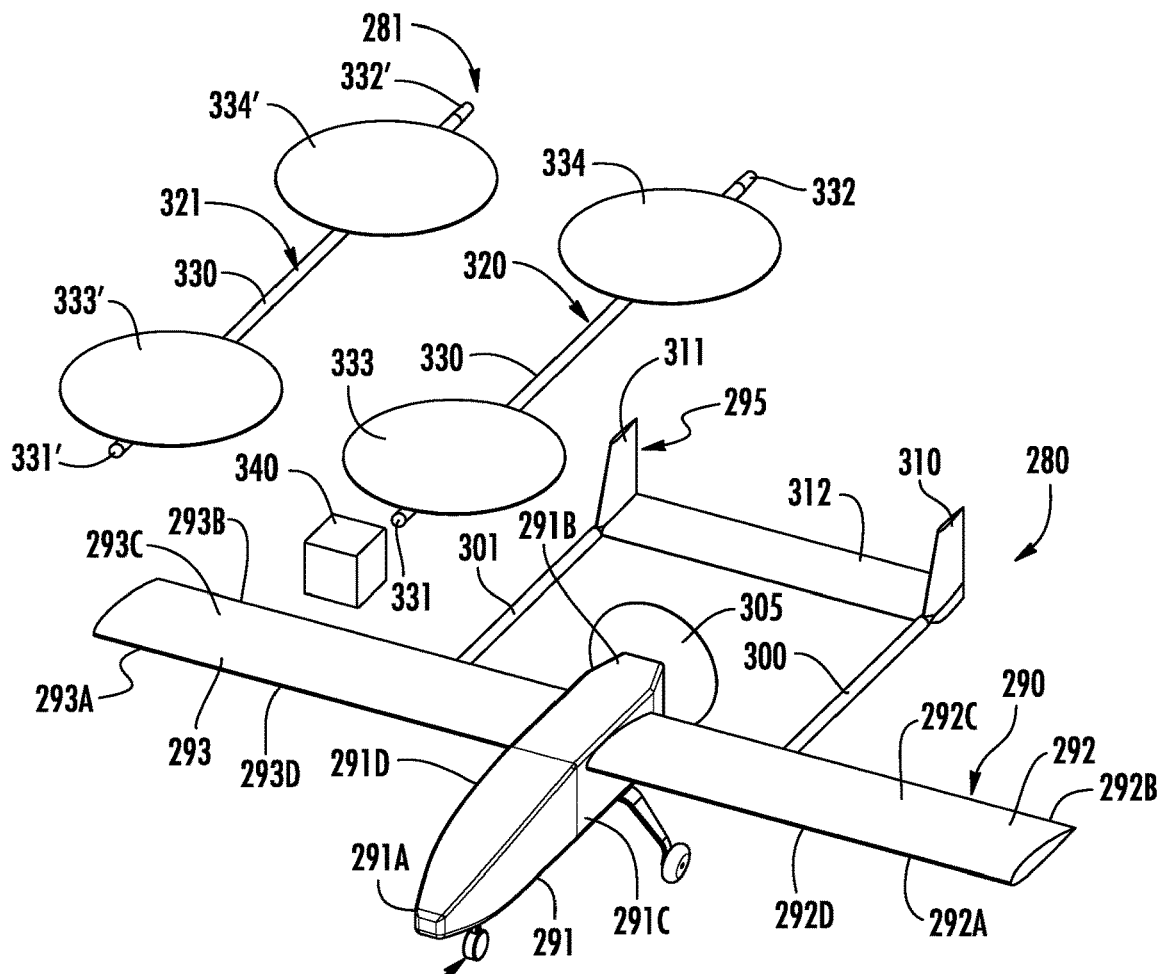
FIG. 30 is a perspective view an aircraft and vertical take-off and landing conversion kit for converting the aircraft to a vertical take-off and lift aircraft.
Figure 31:
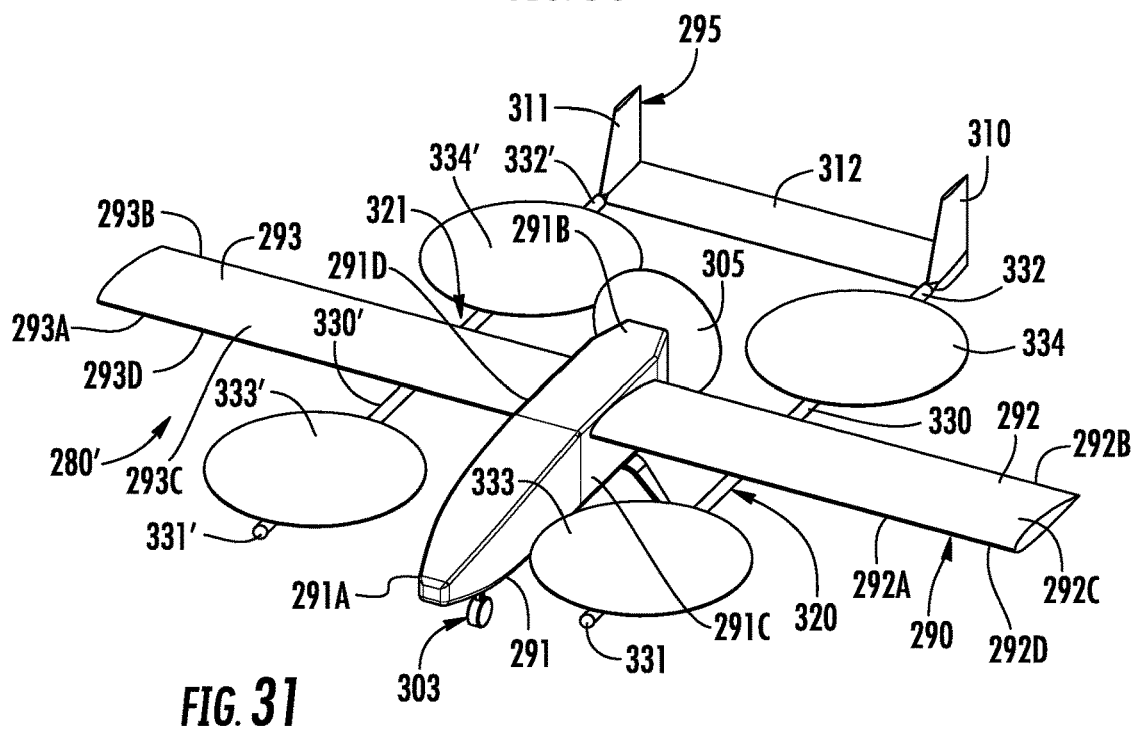
FIGS. 31 and 32 are perspective views corresponding to FIG. 30 illustrating the vertical take-off and landing conversion kit connected to the aircraft for forming a vertical take-off and landing aircraft.
Figure 32:
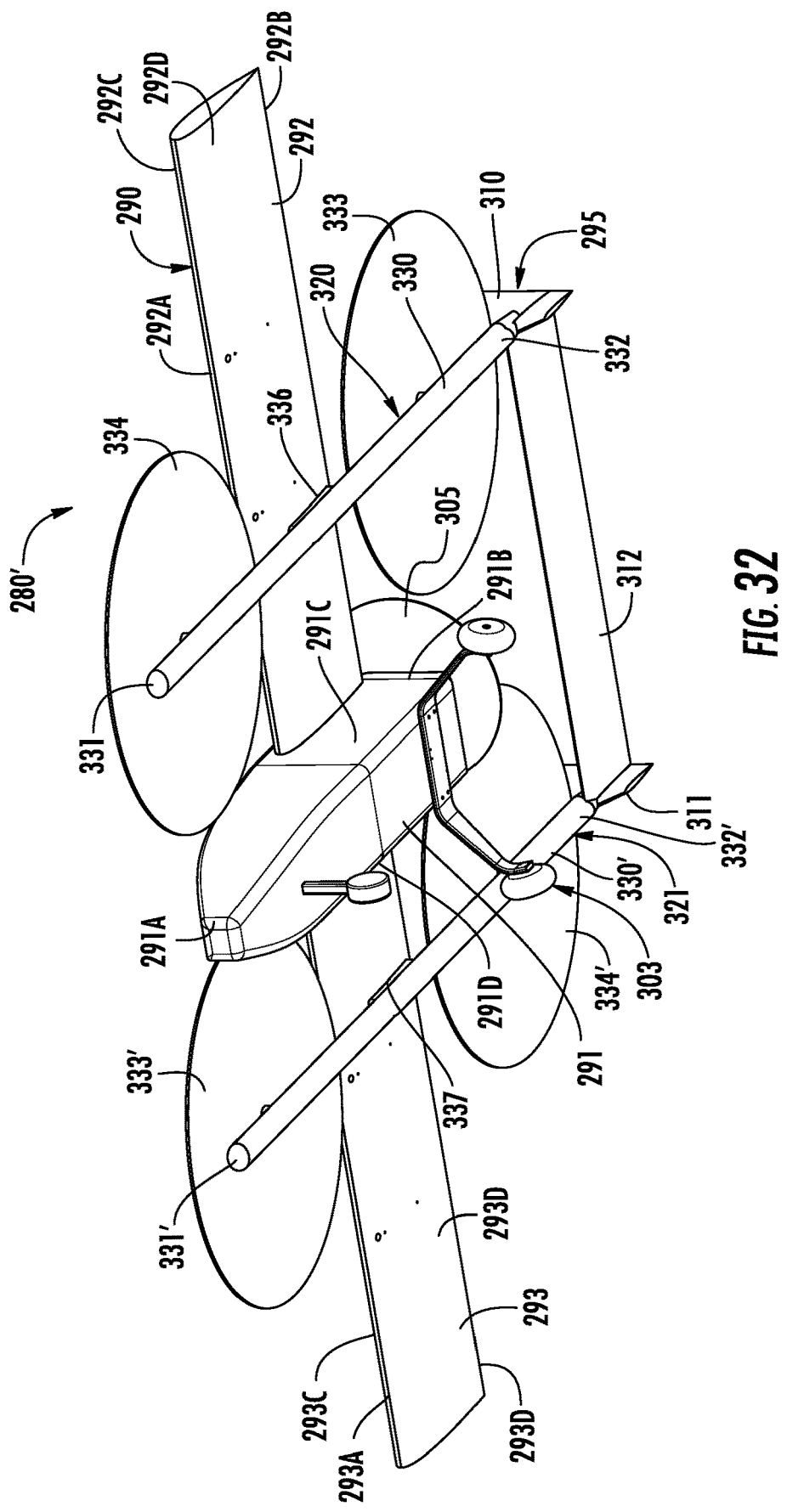

Yet another embodiment of the invention is shown in FIG. 30, in which there is seen aircraft 280, and a VTOL conversion kit 281 for converting aircraft 280 into VTOL aircraft 280' shown in FIGS. 31 and 32. In FIG. 30, aircraft 280 includes an airframe 290 including fuselage 291, fixed left and right wings 292 and 293, tail assembly or empennage 295, left and right tail boom supports 300 and 301, and undercarriage or landing gear 303 on the underside of fuselage 291. Left and right wings 292 and 293 are fixed to fuselage 291, and so airframe 290 is exemplary of a fixed wing airframe. Fuselage 291 has front or leading end/extremity 291A and an opposed rear or trailing end/extremity 291B, and opposed left and right sides 291C and 291D extending from front or leading extremity 291A to rear or trailing extremity 291B. Left wing 292 and right wing 293 are applied to fuselage 291 and are airfoils that produce lift for flight of aircraft 280 through the atmosphere. Left wing 292 has a left leading edge 292A and an opposed left trailing edge 292B, and a left top surface 292C and an opposed left bottom surface 292D that extend between left leading and trailing edges 292A and 292B. Right wing 293 has a right leading edge 293A and an opposed right trailing edge 293B, and a right top surface 293C and an opposed right bottom surface 293D that extend between right leading and trailing edges 293A and 293B. Left and right wings 292 and 293 are the mirror image of one another, and left wing 292 has a thickness or wing thickness extending from top surface 292C to bottom surface 292D, and right wing 293 has a thickness or wing thickness extending from top surface 293C to bottom surface 293D. The wing thickness of left wing 292 is the same as the wing thickness of right wing 293. During flight, a region of lower-than-normal air pressure is generated over top surfaces 292C and 293C of left and right wings 292 and 293, with a higher pressure existing on bottom surfaces 292D and 293D of left and right wings 292 and 293. The lower air pressure on top surfaces 292C and 293C of left and right wings 292 and 293 generates a smaller downward force on the top surfaces 292C and 293C of left and right wings 292 and 293 than the upward force generated by the higher air pressure on the bottom surfaces 292D and 293D of left and right wings 292 and 293. Hence, a net upward force acts on the left and right wings 292 and 293 to generate lift by the left and right wings 292 and 293. Left wing 292 is applied to and extends from left side 291C of fuselage 291 proximate to trailing extremity 291B and right wing 293 is applied to and extends from right side 291D of fuselage 291 proximate to trailing extremity 291B. A left aileron can be retained pivotally on a rear of left wing 292 near trailing edge 292B of left wing 292 near the outer or distal extremity of left wing 292, and a right aileron can be retained pivotally on a rear of right wing 293 near trailing edge 293B of right wing 293 near the outer or distal extremity of right wing 293. Forward thrust rotor 305 driven by an electric or internal combustion engine housed in fuselage 191 is mounted to rear extremity 291B of fuselage 291 and is positioned between rear extremity 291B and empennage 295 and is capable of providing forward thrust to aircraft 50.

Empennage 295 is the rear part of airframe 291 of aircraft 50, gives stability to aircraft 280, and is located behind and is spaced-apart rearwardly from trailing extremity 291B of fuselage 291. In this embodiment, empennage 295 is exemplary of a twin tail assembly or twin tail empennage including left vertical stabilizer 310, right vertical stabilizer 311, and horizontal stabilizer 312 extending between left and right vertical stabilizers 310 and 311. Left tail boom support 300 and right tail boom support 301 of airframe 290 are coupled between the left and right wings 292 and 293, respectively, and empennage 295. Left tail boom support 300 and right tail boom support 301 support or otherwise carry empennage 295. Left tail boom support 300 and right tail boom support 301 are identical being coextensive and equal in size and shape. Left tail boom support 300 is located along left side 291C of fuselage 291, and is spaced-apart from, or is otherwise located outboard of, left side 291C of fuselage 291, is parallel with respect to fuselage 291, and is connected to bottom surface 292D of left wing 292. Right tail boom support 301 is located along right side 291D of fuselage 291, and is spaced-apart from, or is otherwise located outboard of, right side 291D of fuselage 291, is parallel with respect to fuselage 291, and is connected to bottom surface 293D of right wing 293. Left and right tail boom supports 300 and 301 are further parallel with respect to each other.

Left tail boom support 300 extends rearward from left wing 292 and trailing edge 292B of left wing 292 to left stabilizer 310 of empennage 295, and right tail boom support 301 extends rearward from right wing 293 and trailing edge 293B of right wing 293 to right stabilizer 311 of empennage 295. Left stabilizer 310 extends upward from a rear of left tail boom support 300, and right stabilizer 311 extends upward from a rear of right tail boom support 301. Horizontal stabilizer 92 is retained between left and right tail boom supports 300 and 301. A rudder can be retained pivotally on a rear of left stabilizer 310, and a rudder can be retained pivotally on a rear of right stabilizer 311. An elevator can be retained pivotally on a rear of horizontal stabilizer 312.

Aircraft 280 is a standard fixed wing aircraft. Aircraft 280 is an unmanned aerial vehicle (UAV) or drone, and is furnished with the customary onboard UAV or drone autopilot ANP housed in fuselage 291. The ANP is operated by remote control of a navigator or pilot for remotely controlling the operation of aircraft 280. Alternatively, the ANP can be an autonomous system, a self-directing system to provide autonomous control of the operation of aircraft 280. The ANP receives electrical power from the onboard aircraft 280 battery pack, and the ANP is electrically coupled to the onboard aircraft 280 battery pack with conventional, onboard electrical wiring.

VTOL conversion kit 281 includes left and right replacement boom assemblies 320 and 321. Left replacement boom assembly 320 includes straight, elongate boom 330 having front or leading end 331, rear or trailing end 332, a front VTOL thrust rotor 333 mounted atop boom 330 proximate to leading end 331, and an identical rear VTOL thrust rotor 334 mounted atop boom 330 proximate to trailing end 332. Front VTOL thrust rotor 333 and rear VTOL thrust rotor 334 are axially aligned and are coplanar being and operating in the same or common horizontal plane. Front VTOL thrust rotor 333 is driven by an electric motor housed in boom 330 proximate to leading extremity 331, and rear VTOL thrust rotor 334 is driven by an electric motor housed in boom 330 proximate to trialing extremity 332. VTOL thrust rotors 333 and 334 are fixed rotors, which means they do not pivot, articulate, or otherwise translate, and are each completely exposed and not surrounded and housed within thruster housings or casings. As such, VTOL thrust rotors 333 and 334 are "open" thrust rotors being free of thruster housings or casings, which prevents buffeting from occurring in response to the activation of VTOL thrust rotors 333 and 334 during operation, e.g., VTOL maneuvering. Right replacement boom assembly 321 is identical to left replacement boom assembly 320, and for ease of reference identical reference numbers include prime ("'") symbols. In common with left replacement boom assembly 320, right replacement boom assembly 321 shares straight, elongate boom 330' having front or leading end 331', rear or trailing end 332', front VTOL thrust rotor 333' mounted atop boom 330' proximate to leading end 331', and the identical rear VTOL thrust rotor 334' mounted atop boom 330' proximate to trailing end 332'. Front VTOL thrust rotor 333' is driven by an electric motor housed in boom 330' proximate to leading extremity 331', and rear VTOL thrust rotor 334' is driven by an electric motor housed in boom 330' proximate to trialing extremity 332'. Front VTOL thrust rotor 333' and rear VTOL thrust rotor 334' are axially aligned.

Converting aircraft 280 into VTOL aircraft 280' shown in FIGS. 31 and 32 includes the steps of decoupling empennage 295 from left and right tail boom supports 300 and 301, decoupling tail boom supports 300 and 301 from airframe 290, coupling empennage 295 to trailing extremities 332 and 332' of booms 330 and 330' of the respective left and right replacement boom assemblies 320 and 321, coupling booms 330 and 330' at top sides of their middles to bottom surfaces 292D and 293D of the respective wings 292 and 293 with couplings 336 and 337, respectively, shown in FIG. 32, and then operatively coupling empennage 195 and left and right replacement boom assemblies 320 and 321 to the aircraft controls onboard aircraft 280 so as to form VTOL aircraft 280' in FIGS. 30 and 31. Preferably, a VTOL power system 340 in FIG. 30 for powering VTOL thrust rotors 333, 333', 334, and 335 is installed in fuselage 291 and is electrically connected to left and right replacement boom assemblies 320 and 321 and the electrical system onboard aircraft 280 for powering the electric motors that power VTOL thrust rotors 333, 333', 334, and 334'.

In FIGS. 30 and 31, booms 330 and 330' are located on either side of VTOL aircraft 280'. Boom 330 is located along left side 291C of fuselage 291, and is spaced-apart from, or is otherwise located outboard of, left side 291C of fuselage 291 and is parallel with respect to fuselage 291. Boom 330' is located along right side 291D of fuselage 291, and is spaced-apart from, or is otherwise located outboard of, right side 291D of fuselage 291 and is parallel with respect to fuselage 291. Booms 330 and 330' are further parallel with respect to each other. Booms 330 and 330' are coupled between the left and right wings 292 and 293, respectively, and empennage 295.

Boom 330 extends rearward from left wing 292 and trailing edge 292B of left wing 292 to trailing extremity 332 coupled to left stabilizer 310 of empennage 295, and extends forward from left wing 292 and leading edge 292A of left wing 292 to leading extremity 331. Front VTOL thrust rotor 333 is mounted to and atop boom 330 proximate to leading extremity 331. Front VTOL thrust rotor 333 is located along left side 291C of fuselage 291 and is positioned forwardly of leading edge 292A of left wing 292 outboard of left side 291C of fuselage 291 near leading extremity 291A of fuselage 291 and is positioned near left side 291C of fuselage 291 between left side 291C of fuselage 291 and the outer or distal extremity of left wing 292. Rear VTOL thrust rotor 334 is mounted to and atop boom 330 along left side 291C of fuselage 291 and is positioned between of trailing edge 292B of left wing 292 and left stabilizer 310 of empennage 295 outboard of left side 291C of fuselage 291 near trailing extremity 291B of fuselage 291 and is positioned near left side 291C of fuselage 291 between left side 291C of fuselage 291 and the outer or distal extremity of left wing 292.

Boom 330' extends rearward from right wing 293 and trailing edge 293B of right wing 293 to trailing extremity 332' coupled to right stabilizer 310 of empennage 295, and extends forward from right wing 293 and leading edge 293A of right wing 293 to leading extremity 331'. Front VTOL thrust rotor 333' is mounted to and atop boom 330' proximate to leading extremity 331'. Front VTOL thrust rotor 333' is located along right side 291D of fuselage 291 and is positioned forwardly of leading edge 293A of right wing 293 outboard of right side 291D of fuselage 291 near leading extremity 291A of fuselage 291 and is positioned near right side 291D of fuselage 291 between right side 291D of fuselage 291 and the outer or distal extremity of right wing 293. Rear VTOL thrust rotor 334' is mounted to and atop boom 330' along right side 291D of fuselage 291 and is positioned between of trailing edge 293B of right wing 293 and right stabilizer 310 of empennage 295 outboard of right side 291D of fuselage 291 near trailing extremity 291B of fuselage 291 and is positioned near right side 291D of fuselage 291 between right side 291D of fuselage 291 and the outer or distal extremity of right wing 293. Horizontal stabilizer 312 is retained between trailing extremities 332 and 332' of booms 330 and 330'.

Front VTOL thrust rotor 333 and front VTOL thrust rotor 333' are equidistant from, or otherwise with respect to, left and right wings 292 and 293, respectively, and fuselage 291. Rear VTOL thrust rotor 334 and rear VTOL thrust rotor 334' are equidistant from, or otherwise with respect to, left and right wings 292 and 293, respectively, and fuselage 291. Front VTOL thrust rotor 333 diametrically opposes front VTOL thrust rotor 333' proximate to leading extremity 291A of fuselage 291, and rear VTOL thrust rotor 334 diametrically opposes rear VTOL thrust rotor 334 proximate to trailing extremity 291B of fuselage 291. Front VTOL thrust rotor 333 is in-line with respect to rear VTOL thrust rotor 334, and front VTOL thrust rotor 333' 112 is in-line with respect to rear VTOL thrust rotor 334'. Front VTOL thrust rotor 333 is on left side 291C of fuselage 291 and is thus a left front VTOL thrust rotor, front VTOL thrust rotor 333' is on right side 291C of fuselage 291 and is thus a right front VTOL thrust rotor, rear VTOL thrust rotor 334 is on left side 291C of fuselage 291 and is thus a left rear VTOL thrust rotor, and rear VTOL thrust rotor 334' is on right side 291D of fuselage 291 and is thus a right rear VTOL thrust rotor. Front VTOL thrust rotor 333 and rear VTOL thrust rotor 334 define one set of VTOL thrust rotors of VTOL aircraft 280' proximate to left side 291C of fuselage 291. Front VTOL thrust rotor 333 and rear VTOL thrust rotor 334 define another set of VTOL thrust rotors of aircraft 280' proximate to right side 291D of fuselage 291.

VTOL thrust rotors 333, 333', 334, and 334 define the VTOL propulsion system, or simply a VTOL system, of VTOL aircraft 280', which is a quadrotor VTOL system including a left front VTOL thrust rotor 333, left rear VTOL thrust rotor 334, right front VTOL thrust rotor 333', and right rear VTOL thrust rotor 334', which are capable of providing vertical lift to aircraft 280 and yaw control authority. VTOL thrust rotors 333, 333', 334, and 334' are arranged in a quadrotor pattern for providing standard vertical lift to aircraft 50, and are and are coplanar being and operating in the same or common horizontal plane.

VTOL thrust rotors 333, 333', 334, and 334' provide for vertical take-off and lift and left and right yaw control authority by selectively increasing and decreasing thrust, and forward thrust rotor 305 provides for forward thrust during flight. As in the previous embodiments, VTOL aircraft 280' is a UAV and is furnished with the customary onboard UAV or drone autopilot ANP housed in fuselage 291. As in the previous embodiments, the ANP is operated by remote control of a navigator or pilot for remotely controlling the operation of VTOL aircraft 280'. The ANP can be an autonomous system, a self-directing system to provide autonomous control of the operation of VTOL aircraft 280'. The ANP can be reconfigured into a combined partially manual and partially autonomous mode. In this mode, the manual pilot provides angle commands while the autopilot provides low-level stability and control, including yaw controlling.

Starting with a standard aircraft, namely, aircraft 280, VTOL conversion kit 281 can be added to aircraft 280 to quickly and conveniently convert aircraft 280 into VTOL aircraft 280. Rotors 333, 333', 334, and 334' can be fixed rotors, or laterally tilted rotors disclosed in the previous embodiments.

Figure 33:
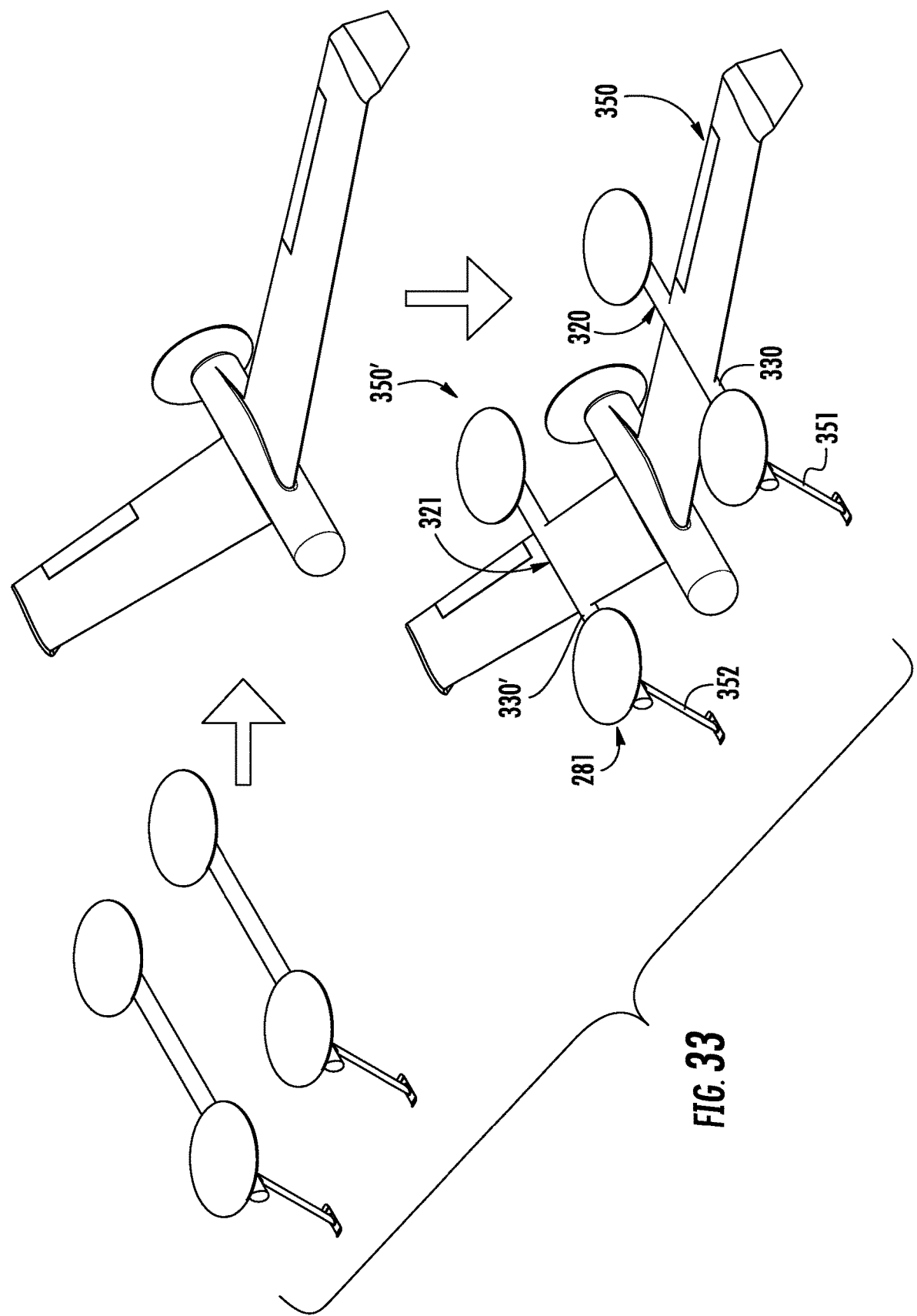
FIG. 33 is a perspective view of the vertical take-off and landing conversion kit of FIG. 30 shown incorporated with an alternate embodiment of an aircraft for forming an alternate embodiment of a vertical take-off and landing aircraft, the vertical take-off and landing conversion kit shown as it would appear formed with an undercarriage.

VTOL conversion kit 281 can be incorporated not only with aircraft 28 but also with other aircraft platforms, such as tractor engine aircraft, flying wing aircraft, etc. As a matter of example, FIG. 33 is a perspective view of VTOL conversion kit 281 of FIG. 30 shown incorporated with an alternate embodiment of an aircraft 350 for forming an alternate embodiment of a VTOL aircraft 350'. In FIG. 33, aircraft 350 is a flying wing, and left and right replacement boom assemblies 320 and 321 of VTOL conversion kit 281 are shown connected to the left and right wings, respectively, of the flying wing. The VTOL conversion kit 281 is connected to aircraft 350 as discussed above in connection with aircraft 280 forming a quadrotor VTOL system. In FIG. 33, booms 330 and 330' incorporate skids 351 and 352, respectively. Skid 351 extends downwardly and forwardly from leading extremity 321 of boom 330, and skid 352 extends downwardly and forwardly of leading extremity 331' of boom 330'. Skids 351 and 352 are identical and form a landing gear or undercarriage of for supporting VTOL aircraft 350' when it is not flying and for landing and take-off.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A vertical take-off and landing aircraft, comprising:
   a fixed wing airframe having first and second wings extending from first and second sides, respectively, of a fuselage having a leading extremity and a trailing extremity, and a tail assembly located behind the trailing extremity;
   a forward thrust rotor mounted to the airframe for providing forward thrust to the aircraft;
   vertical take-off and landing (VTOL) thrust rotors mounted to the airframe for providing vertical lift to the aircraft, the VTOL thrust rotors include a first set of VTOL thrust rotors proximate to the first side of the fuselage and a second set of VTOL thrust rotors proximate to the second side of the fuselage;
   the VTOL thrust rotors of the first set of VTOL thrust rotors are identically laterally tilted to a lateral tilt with respect to the fuselage;
   the VTOL thrust rotors of the second set of VTOL thrust rotors are identically laterally tilted to a lateral tilt with respect to the fuselage; and
   the lateral tilt of the VTOL thrust rotors of the first set of VTOL thrust rotors is the mirror image of the lateral tilt of the VTOL thrust rotors of the second set of VTOL thrust rotors;
   wherein the VTOL thrust rotors receive control inputs to increase or decrease the thrust of one or more of the VTOL thrust rotors independently of the other VTOL thrust rotors and the forward thrust rotor to effect independent control of the roll, pitch, yaw, and vertical thrust of the aircraft independent of differential torque between pairs of the VTOL thrust rotors that is augmented by lateral thrust components associated with the lateral tilt of the VTOL thrust rotors during lifting of the aircraft to increase yaw control, and further wherein the forward thrust rotor is activated independently of the VTOL thrust rotors to provide forward thrust of the aircraft during flight.

2. The vertical take-off and landing aircraft according to claim 1, wherein the first set of VTOL thrust rotors includes a first front VTOL thrust rotor and a first rear VTOL thrust rotor each located outboard of the first side of the fuselage between the leading extremity of the fuselage and the tail assembly, and the second set of VTOL thrust rotors includes a second front VTOL thrust rotor and a second rear VTOL thrust rotor each located outboard of the second side of the fuselage between the leading extremity of the fuselage and the tail assembly.

3. The vertical take-off and landing aircraft according to claim 2, wherein the first front VTOL thrust rotor and the second front VTOL thrust rotor are diametrically opposed, and are equidistant with respect to the first and second wings, respectively, and the fuselage.

4. The vertical take-off and landing aircraft according to claim 3, wherein the first rear VTOL thrust rotor and the second rear VTOL thrust rotor are diametrically opposed, and are equidistant with respect to the first and second wings, respectively, and the fuselage.

5. The vertical take-off and landing aircraft according to claim 4, wherein the first front VTOL thrust rotor is in-line with respect to the first rear VTOL thrust rotor, and the second front VTOL thrust rotor is in-line with respect to the second rear VTOL thrust rotor.

6. The vertical take-off and landing aircraft according to claim 1, wherein the VTOL thrust rotors are laterally tilted inwardly with respect to the fuselage so as to direct their respective thrusts downwardly under the fuselage and inwardly towards the fuselage.

7. The vertical take-off and landing aircraft according to claim 1, wherein the VTOL thrust rotors are laterally tilted outwardly with respect to the fuselage so as to direct their respective thrusts downwardly under the fuselage and outwardly away from the fuselage.

8. The vertical take-off and landing aircraft according to claim 1, wherein the VTOL thrust rotors are laterally tilted four degrees from horizontal with respect to the fuselage.

9. The vertical take-off and landing aircraft according to claim 1, wherein the VTOL thrust rotors are open thrust rotors.

10. The vertical take-off and landing aircraft according to claim 1, wherein the VTOL thrust rotors are each driven for rotation by an electric motor, the electric motor receiving electrical power from a battery pack onboard the aircraft.

11. The vertical take-off and landing aircraft according to claim 1, wherein the vertical take-off and landing aircraft is an unmanned aerial vehicle.

12. The vertical take-off and landing aircraft according to claim 1, wherein the first set of VTOL thrust rotors have the same direction of rotation and the second set of VTOL thrust rotors have an opposition direction of rotation relative to the direction of rotation of the first set of VTOL thrust rotors.

13. The vertical take-off and landing aircraft according to claim 1, further comprising at least one pivoting engine pod configured to adjust the lateral tilt of a VTOL thrust rotor.

14. The vertical take-off and landing aircraft according to claim 1, wherein the first set of VTOL thrust rotors rotate in a first direction and the second set of VTOL thrust rotors rotate in a second direction opposite the first direction such that yaw control is accomplished by a combination of different torque and lateral thrust components of the VTOL thrust rotors.

15. A vertical take-off and landing aircraft, comprising:
a fixed wing airframe having first and second wings extending from first and second sides, respectively, of a fuselage having a leading extremity and a trailing extremity, and an empennage provided behind the trailing extremity;
a forward thrust rotor mounted to the trailing extremity of the fuselage, disposed between the trailing extremity and the empennage, the forward thrust rotor providing forward thrust to the aircraft;
vertical take-off and landing (VTOL) thrust rotors mounted to the airframe comprising: a first set of VTOL thrust rotors proximate to the first side of the fuselage; and
a second set of VTOL thrust rotors proximate to the second side of the fuselage;
wherein the VTOL thrust rotors of the first set of VTOL thrust rotors are identically laterally tilted to a lateral tilt with respect to the fuselage;
wherein the VTOL thrust rotors of the second set of VTOL thrust rotors are identically laterally tilted to a lateral tilt with respect to the fuselage; and
wherein the lateral tilt of the VTOL thrust rotors of the first set of VTOL thrust rotors is the mirror image of the lateral tilt of the VTOL thrust rotors of the second set of VTOL thrust rotors;
wherein the VTOL thrust rotors receive control inputs to increase or decrease the thrust of one or more of the VTOL thrust rotors independently of the other VTOL thrust rotors and the forward thrust rotor to effect independent control of the roll, pitch, yaw, and vertical thrust of the aircraft independent of differential torque between pairs of the VTOL thrust rotors that is augmented by lateral thrust components associated with the lateral tilt of the VTOL thrust rotors during lifting of the aircraft to increase yaw control, and further wherein the forward thrust rotor is activated independently of the VTOL thrust rotors to provide forward thrust of the aircraft during flight.

16. The vertical take-off and landing aircraft according to claim 15, wherein the first set of VTOL thrust rotors rotate in a first direction and the second set of VTOL thrust rotors rotate in a second direction opposite the first direction such that yaw control is accomplished by a combination of different torque and lateral thrust components of the VTOL thrust rotors.

* * * * *